(12) United States Patent
Woodhull et al.

(10) Patent No.: US 10,346,599 B2
(45) Date of Patent: Jul. 9, 2019

(54) MULTI-FUNCTION BUTTON FOR COMPUTING DEVICES

(71) Applicant: GOOGLE LLC

(72) Inventors: Charles B. Woodhull, Los Gatos, CA (US); Kelvin Kwong, San Jose, CA (US); Bryan Patrick Kiple, Los Gatos, CA (US)

(73) Assignee: GOOGLE LLC, Mountain View, CA (US)

(*) Notice: Subject to any disclaimer, the term of this patent is extended or adjusted under 35 U.S.C. 154(b) by 261 days.

(21) Appl. No.: 15/169,224

(22) Filed: May 31, 2016

(65) Prior Publication Data

US 2017/0344733 A1   Nov. 30, 2017

(51) Int. Cl.
| | |
|---|---|
| *G06F 21/00* | (2013.01) |
| *G06F 21/32* | (2013.01) |
| *G06F 3/0488* | (2013.01) |
| *G06F 3/041* | (2006.01) |
| *G06F 3/0482* | (2013.01) |

(Continued)

(52) U.S. Cl.
CPC ............ *G06F 21/32* (2013.01); *G06F 3/0414* (2013.01); *G06F 3/0482* (2013.01); *G06F 3/04883* (2013.01); *G06F 3/04886* (2013.01); *G06K 9/0002* (2013.01); *H04L 63/0861* (2013.01); *G06F 2203/0338* (2013.01)

(58) Field of Classification Search
CPC ...... G06F 21/32; G06F 3/0414; G06F 3/0482; G06F 3/04883; G06F 2203/0338; G06K 9/0002; H04L 63/0861
See application file for complete search history.

(56) References Cited

U.S. PATENT DOCUMENTS

| | | |
|---|---|---|
| 6,393,139 B1 | 5/2002 | Lin et al. |
| 6,944,773 B1 | 9/2005 | Abrahams |
| 7,631,811 B1 | 12/2009 | Brown |

(Continued)

FOREIGN PATENT DOCUMENTS

| | | |
|---|---|---|
| EP | 1050993 A2 | 11/2000 |
| EP | 1418486 A2 | 12/2004 |

(Continued)

OTHER PUBLICATIONS

Combined Search and Examination Report from counterpart United Kingdom Application No. GB2550996, dated Jun. 20, 2017, 9 pp.

(Continued)

*Primary Examiner* — Sarah Su
(74) *Attorney, Agent, or Firm* — Morris & Kamlay LLP

(57) ABSTRACT

A computing device is described that receives fingerprint data that is generated by at least one sensor of the computing device and determines, based on a comparison of the fingerprint data with data associated with a fingerprint of an authorized user of the computing device, whether to authorize access to one or more applications that are executable by the computing device. Responsive to determining that access to the one or more applications is authorized, the computing device determines a gesture indicated by the fingerprint data, selects, based on the gesture, an application of the one or more applications as a selected application, and outputs, for display, a graphical user interface of the selected application.

23 Claims, 16 Drawing Sheets

(51) Int. Cl.
*G06K 9/00* (2006.01)
*H04L 29/06* (2006.01)

(56) References Cited

U.S. PATENT DOCUMENTS

| | | | |
|---|---|---|---|
| 8,351,979 B2 | 1/2013 | Seguin et al. | |
| 9,176,614 B2 | 11/2015 | Alameh et al. | |
| 2002/0138742 A1 | 9/2002 | Hamid et al. | |
| 2003/0054800 A1 | 3/2003 | Miyashita | |
| 2004/0210771 A1 | 10/2004 | Wood et al. | |
| 2005/0223235 A1 | 10/2005 | Nicholas | |
| 2007/0140530 A1 | 6/2007 | Coogan | |
| 2010/0231356 A1 | 9/2010 | Kim | |
| 2011/0287741 A1 | 11/2011 | Prabhu | |
| 2011/0291946 A1 | 12/2011 | Mann et al. | |
| 2012/0105081 A1 | 5/2012 | Shaikh | |
| 2013/0082974 A1* | 4/2013 | Kerr | G06F 21/6245 345/174 |
| 2013/0129162 A1* | 5/2013 | Cheng | G06F 21/32 382/124 |
| 2013/0278383 A1 | 10/2013 | Boshra | |
| 2013/0283199 A1 | 10/2013 | Selig et al. | |
| 2014/0181962 A1* | 6/2014 | Seo | G06F 21/32 726/19 |
| 2015/0127965 A1* | 5/2015 | Hong | H04L 9/3231 713/323 |
| 2015/0135108 A1 | 5/2015 | Pope et al. | |
| 2015/0137938 A1 | 5/2015 | Slaby et al. | |
| 2015/0324569 A1* | 11/2015 | Hong | G06F 21/32 345/174 |
| 2016/0063230 A1* | 3/2016 | Alten | G06F 21/32 726/28 |
| 2017/0024597 A1* | 1/2017 | Cho | G06F 21/32 |
| 2018/0032785 A1* | 2/2018 | Li | G06F 3/0484 |
| 2018/0114046 A1* | 4/2018 | Shimada | H04M 1/00 |

FOREIGN PATENT DOCUMENTS

| | | |
|---|---|---|
| EP | 2230623 A1 | 9/2010 |
| GB | 2482988 A | 2/2012 |
| KR | 20160042522 A | 4/2016 |

OTHER PUBLICATIONS

Response to Combined Search and Examination Report dated Jun. 20, 2017, from counterpart United Kingdom Application No. GB2550996, filed Feb. 12, 2018, 26 pp.

Holz et al., "Fiberio: A Touchscreen that Senses Fingerprints," Proceedings of the 26th annual ACM symposium on User Interface Software and Technology, Oct. 8-11, 2013, 10 pp.

Kim et al., "Multi-Touch Authentication on Tabletops", Proceedings of ACM CHI 2010 Conference on Human Factors in Computing Systems: Input, Security, and Privacy Policies, Apr. 10-15, 2010, pp. 1093-1102, Atlanta, GA, USA.

Feng et al., "Continuous Mobile Authentication using Touchscreen Gestures", 2012 IEEE Conf. on Technologies for Homeland Security (HST), Nov. 13-15, 2012, pp. 451-456.

Sae-Bae et al., "Biometric-Rich Gestures: A Novel Approach to Authentication on Multi-Touch Devices", Proceedings of SIG CHI2012 Conference on Human Factors in Computing Systems, May 5-10, 2012, pp. 977-986, Austin, TX, USA.

MORPHO, "Identification Morphotop Live Scan Device", http://www.morpho.com/IMG/pdf/morpho_identification_ive_morphotop-3.pdf, Oct. 2012, 2 pages.

LENOVO, "How to Configure Fingerprint Reader Software—ThinkPad R52, T42/p, T43/p, X41, X41 Tablet", Document ID: HT036545, 2013, 21 pages. "Applicant points out, in accordance with MPEP 609.04(a), that the year of publication, 2013, is sufficiently earlier than the effective U.S. filing date, May **, 2016, so that the particular month of publication is not in issue.".

MONDOKEY, "MONDOKEY Biometric Access Control Security System", MondoKey Brochure Version B, 2012, 32 pages. "Applicant points out, in accordance with MPEP 609.04(a), that the year of publication, 2012, is sufficiently earlier than the effective U.S. filing date, May **, 2016, so that the particular month of publication is not in issue.".

Multi-action Home Button-Android Apps on Google Play, Retrieved on Feb. 22, 2016 from https://play.google.com/store/apps/details?id=com.home.button.bottom, 4 pgs.

Cody Lee, "Touch ID could gain new gaming features, scrolling and more", iDownloadBlog, May 16, 2015, Retrieved from http://www.idownloadblog.com/2015/05/16/touchidgamingscrolling/, 5 pgs.

\* cited by examiner

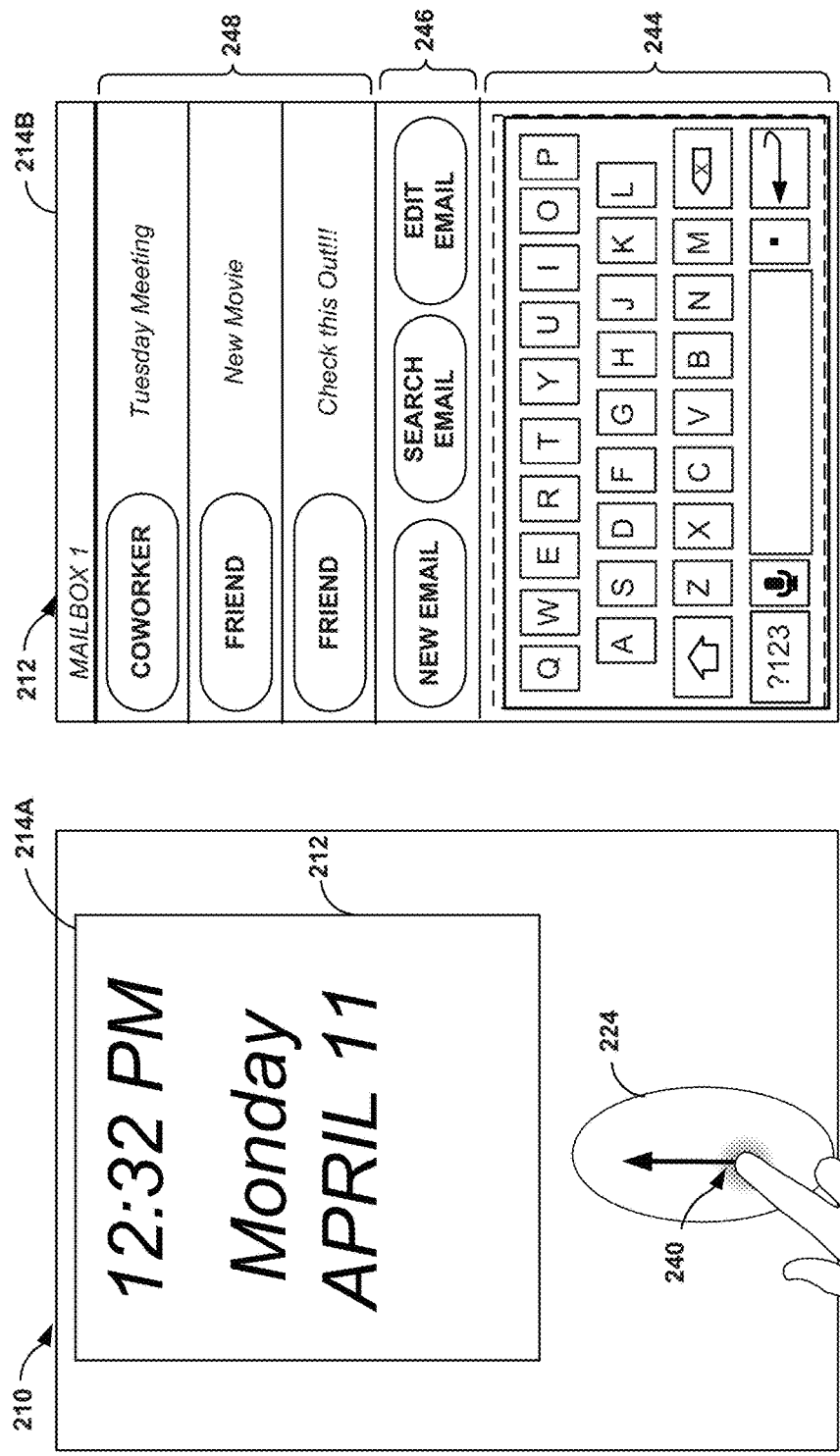

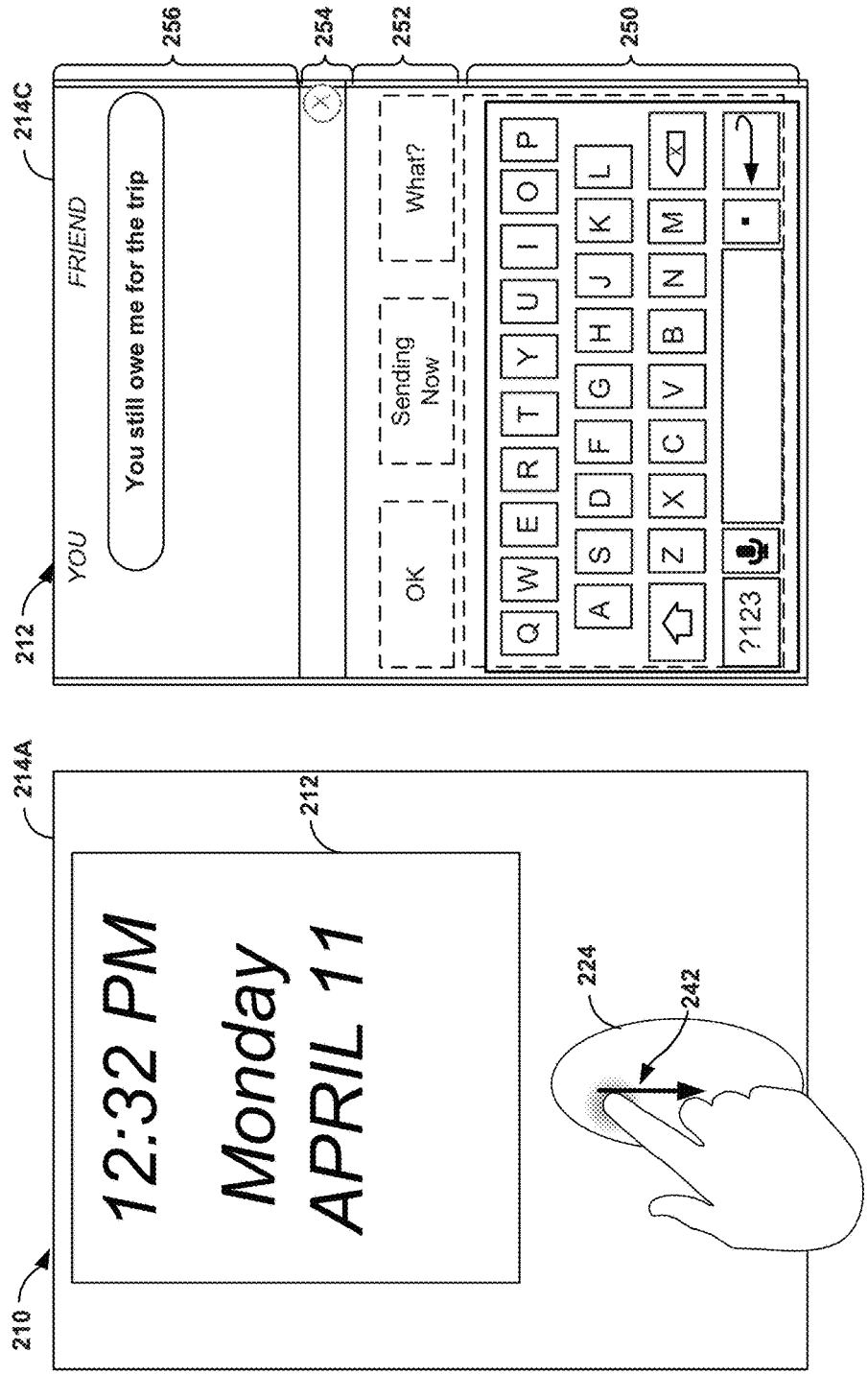

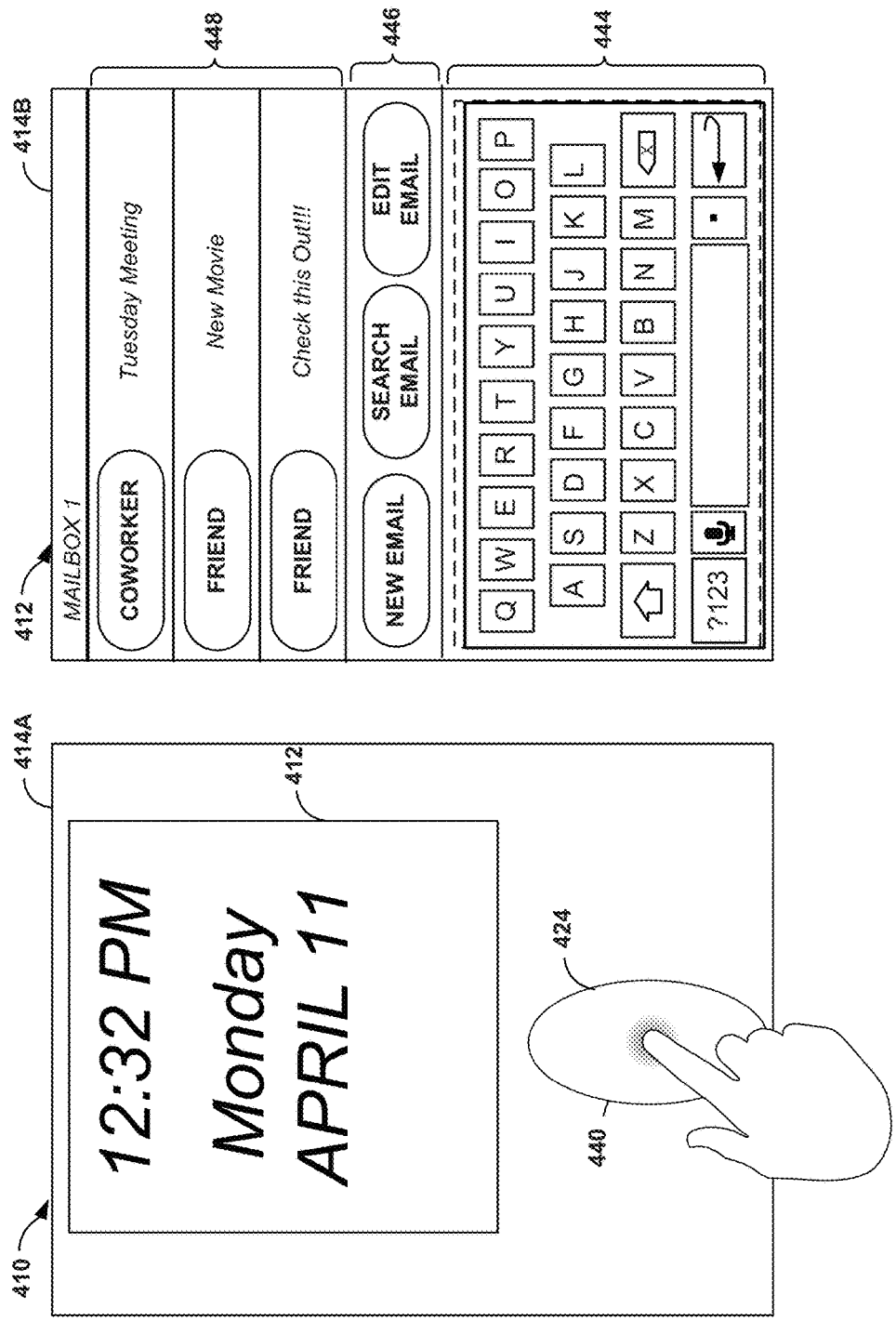

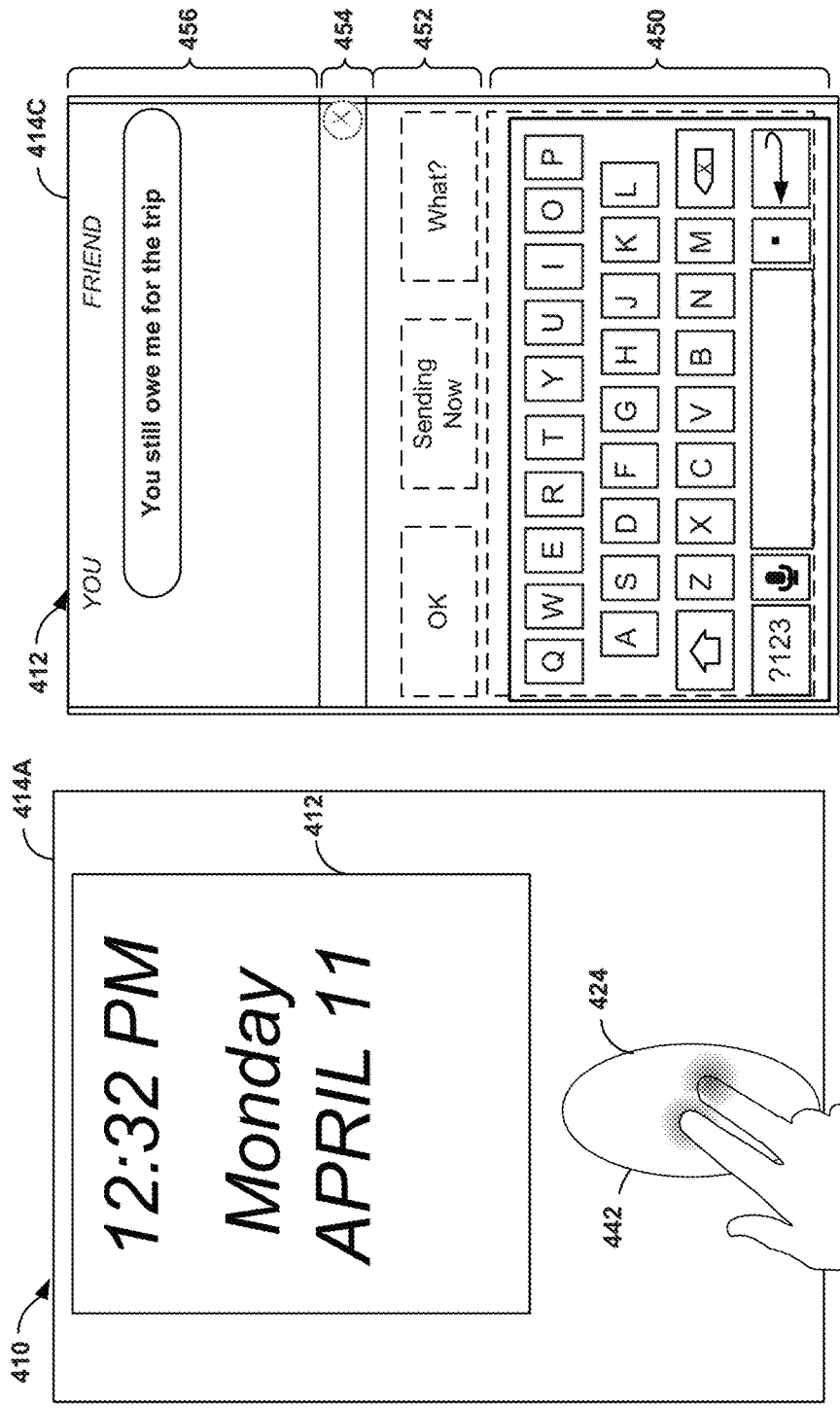

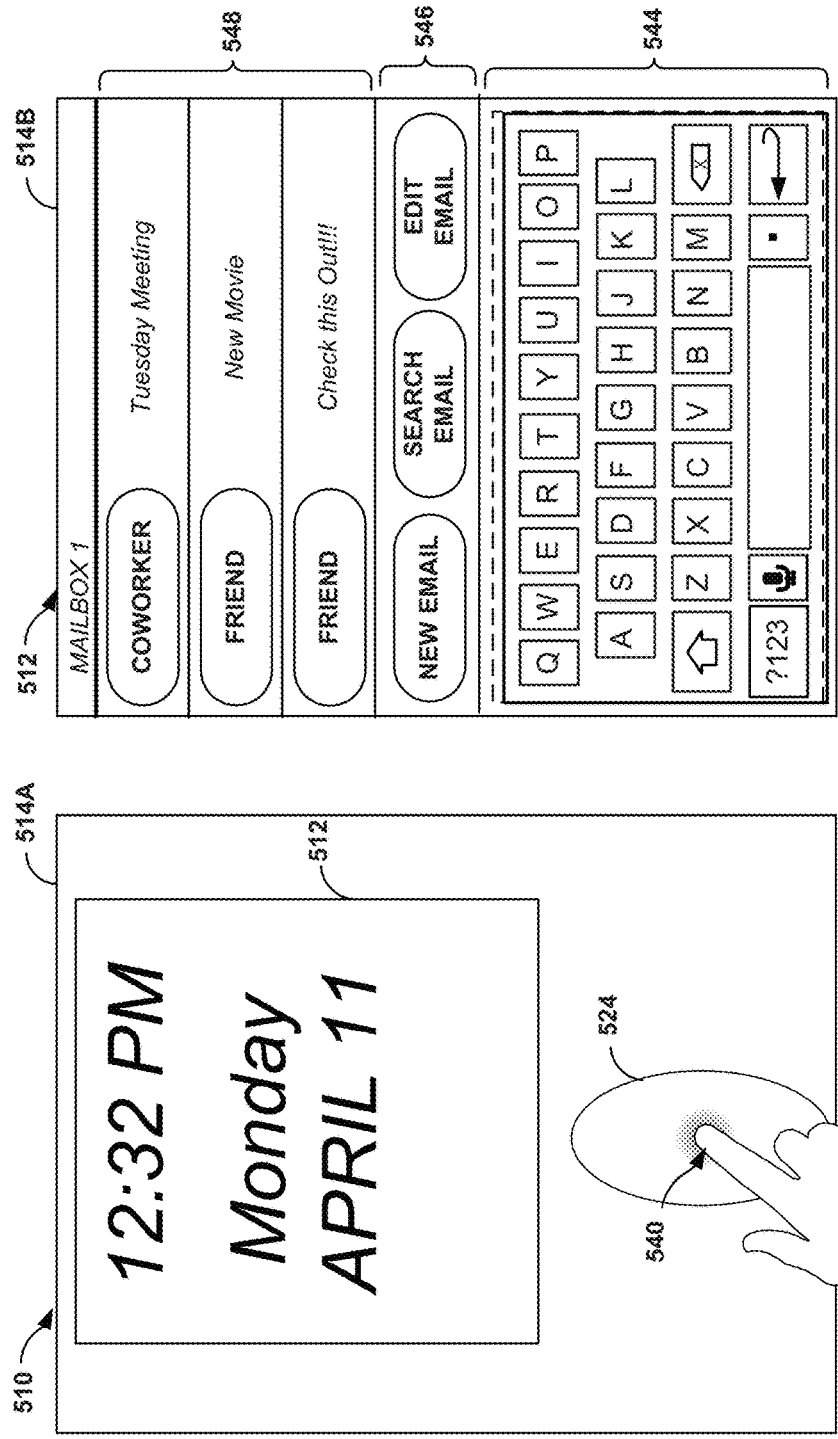

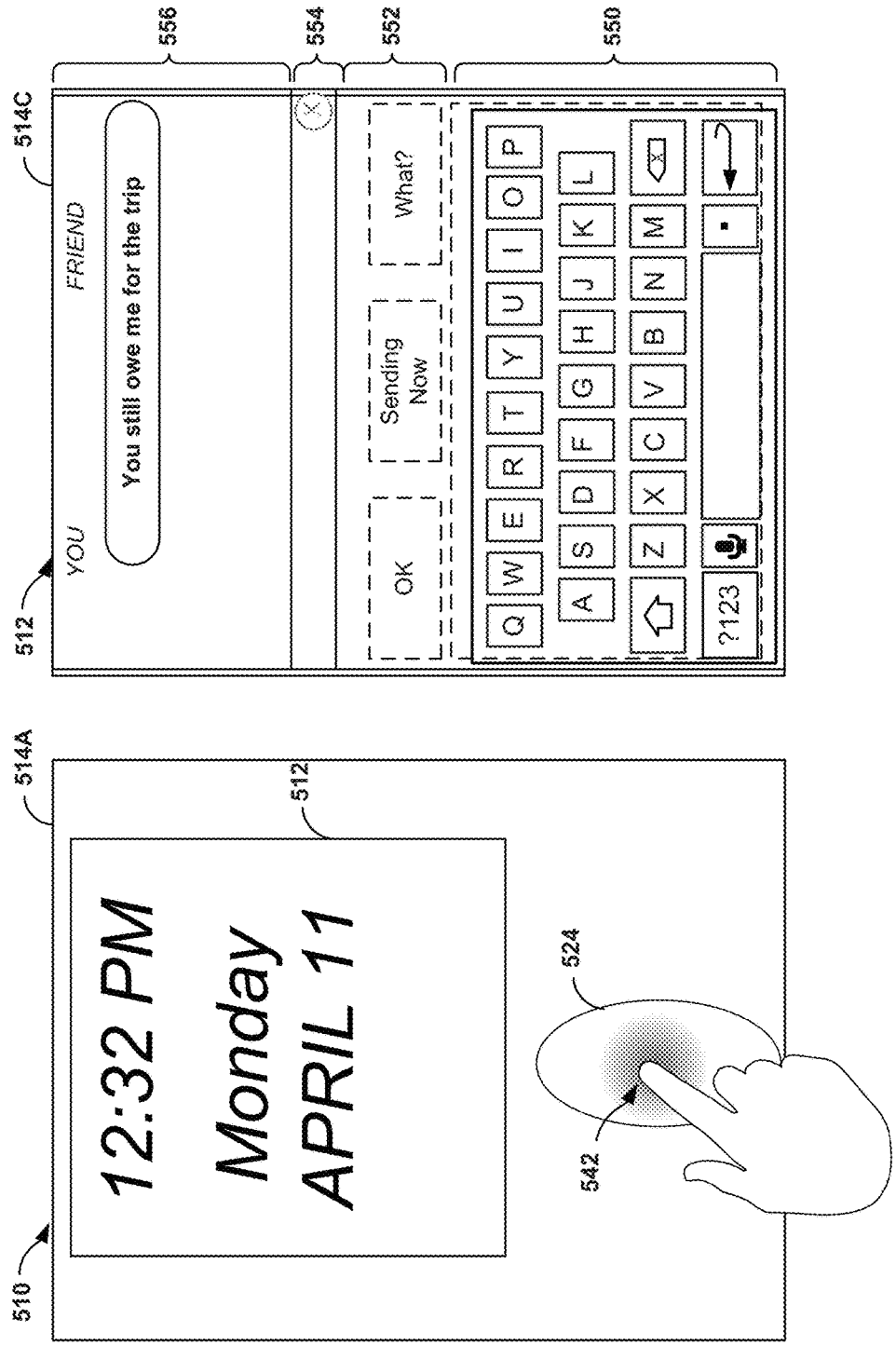

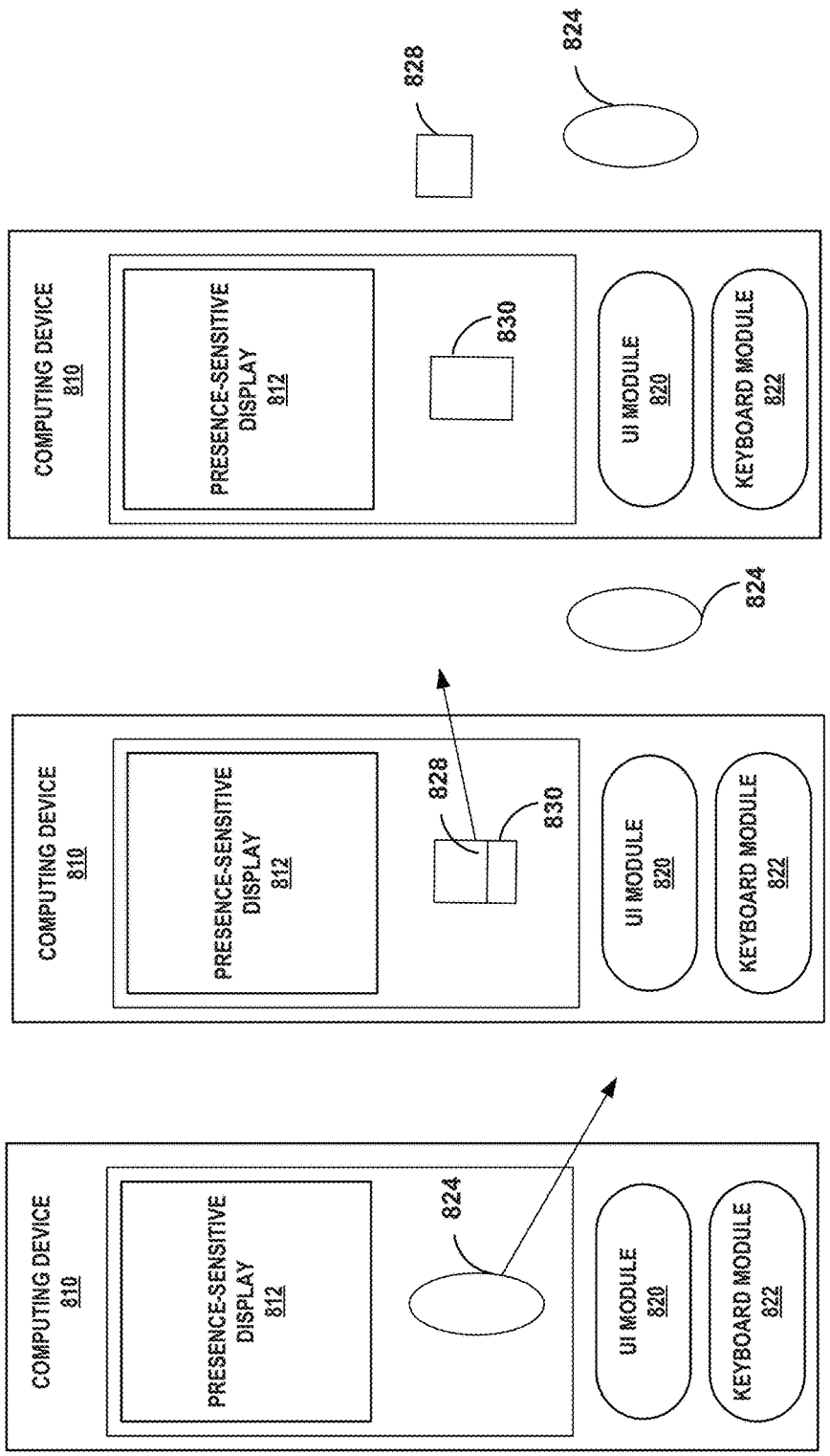

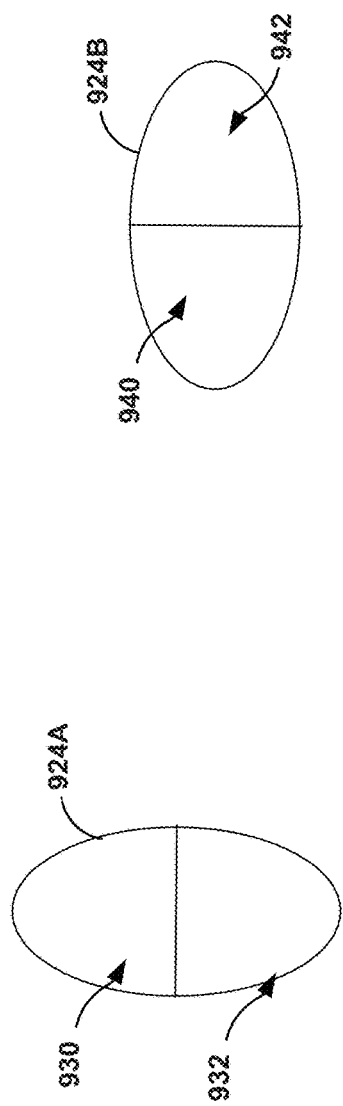
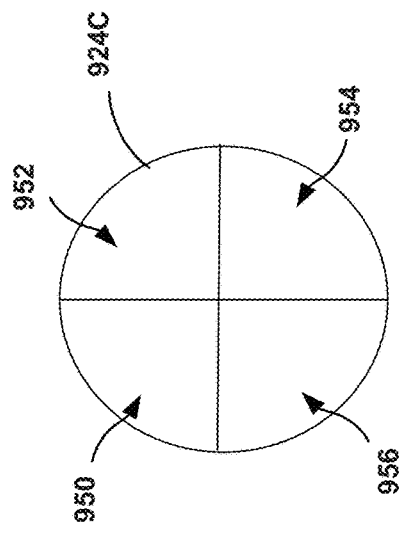
FIG. 9A
FIG. 9B
FIG. 9C

MULTI-FUNCTION BUTTON FOR COMPUTING DEVICES

BACKGROUND

Authentication processes may be used to prevent unauthorized access to mobile computing devices. To interact with a mobile computing device in a locked state, an authentication challenge must typically be satisfied to transition the mobile computing device into an unlocked state. Once, the mobile computing device is in the unlocked state, the user may access a desired application using the mobile computing device.

SUMMARY

In an example, a method includes receiving, by a computing device, fingerprint data that is generated by at least one sensor of the computing device. The method further includes determining, by the computing device and based on a comparison of the fingerprint data with data that is associated with a fingerprint of an authorized user of the computing device, whether to authorize access to one or more applications that are executable by the computing device. The method further includes responsive to determining that access to the one or more applications is authorized, determining, by the computing device, a gesture indicated by the fingerprint data, selecting, by the computing device and based on the gesture, an application of the one or more applications as a selected application, and responsive to selecting the application of the one or more applications as the selected application, outputting, by the computing device and for display, a graphical user interface of the selected application.

In some examples, a computing device includes a presence-sensitive display, at least one sensor, at least one processor, and a computer-readable storage device. The at least one sensor is configured to generate fingerprint data. The at least one sensor is separate from the presence-sensitive display. The computer-readable storage device stores instructions that when executed by the at least one processor cause the at least one processor to receive fingerprint data that is generated by the at least one sensor, and determine, based on a comparison of the fingerprint data with data associated with a fingerprint of an authorized user of the computing device, whether to authorize access to one or more applications that are executable by the computing device. The instructions, when executed, cause the at least one processor to, responsive to determining that access to the one or more applications is authorized, determine a gesture indicated by the fingerprint data, select, based on the gesture, an application of the one or more applications as a selected application, and responsive to selecting the application of the one or more applications as the selected application, output, for display at the presence-sensitive display, a graphical user interface of the selected application.

In some examples, a computer-readable storage medium is encoded with instructions that, when executed by at least one processor of a computing device, cause the at least one processor to receive fingerprint data that is generated by at least one sensor of the computing device and determine, based on a comparison of the fingerprint data with data that is associated with a fingerprint of an authorized user of the computing device, whether to authorize access to one or more applications that are executable by the computing device. The instructions, when executed, cause the at least one processor to, responsive to determining that access to the one or more applications is authorized, determine a gesture indicated by the fingerprint data, select, based on the gesture, an application of the one or more applications as a selected application, and responsive to selecting the application of the one or more applications as the selected application, output, for display, a graphical user interface of the selected application.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 2A-D are conceptual diagrams illustrating an example computing device that is configured to select an application according to a swipe direction, in accordance with one or more aspects of the present disclosure.

FIGS. 4A-D are conceptual diagrams illustrating an example computing device that is configured to select an application according to a quantity of digits used to generate fingerprint data, in accordance with one or more aspects of the present disclosure.

FIGS. 5A-D are conceptual diagrams illustrating an example computing device that is configured to select an application according to an amount of pressure used to generate fingerprint data, in accordance with one or more aspects of the present disclosure.

FIGS. 8A-C are conceptual diagrams illustrating an example computing device that is configured to provide access to components within the computing device using a multi-function button, in accordance with one or more aspects of the present disclosure.

FIGS. 9A-C are conceptual diagrams illustrating example multi-function buttons, in accordance with one or more aspects of the present disclosure, in accordance with one or more aspects of the present disclosure.

DETAILED DESCRIPTION

Figure 1A:
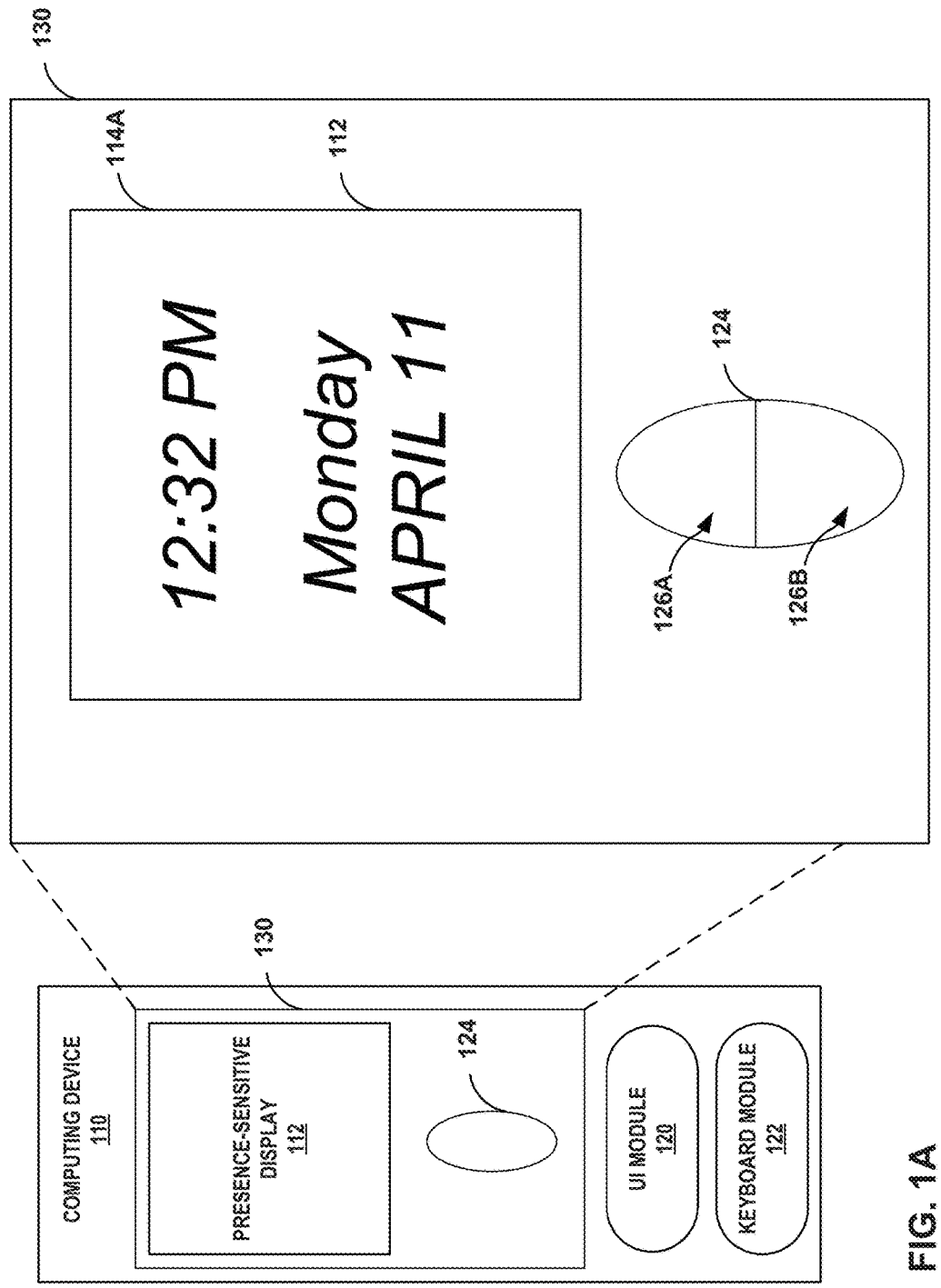
FIGS. 1A-E are conceptual diagrams illustrating an example computing device that is configured to output a graphical user interface of a selected application when access to the selected application is authorized, in accordance with one or more aspects of the present disclosure.

In general, this disclosure is directed to techniques for enabling a computing device to authenticate a user and output, without further user input, a graphical user interface (GUI) of a selected application. For example, rather than the computing device simply reading a fingerprint to determine whether or not to provide access to applications of the computing device and requiring further input to navigate to a desired application, the computing device may be configured to determine a gesture indicated by the fingerprint data and output a graphical user interface of an application associated with the gesture when access to the application is authorized.

In some examples, the computing device generates fingerprint data from a fingerprint received at a first region (e.g., bottom) of a fingerprint reader of the computing device. Based on receiving the fingerprint data at the first region of the fingerprint reader, the computing device outputs, for display, a GUI of a first application (e.g., an email application). On the other hand, based on receiving the fingerprint data at a second region (e.g., top) of the fingerprint reader, the computing device outputs, for display, a GUI of a second application (e.g., a chat application). In some examples, the computing device may use other information indicated in the fingerprint data to select the application. For example, the computing device may use a swipe direction indicated by the fingerprint data to select an application. In some examples, the computing device may use a digit used to generate the fingerprint data to select an application. In some examples, the computing device may use a number of digits used to generate the fingerprint data to select an application. In some examples, the computing device may use an amount of pressure applied to generate the fingerprint data to select an application.

By permitting the computing device to select an application based on a gesture indicated in fingerprint data, a user of the example computing device may quickly access a desired application without, e.g., necessarily having to wade through multiple pages of a home screen to find a desired application. In this way, techniques of this disclosure may reduce the amount of time and the number of user inputs required by a computing device to identify a particular application, which may simplify the user experience and may reduce power consumption of a computing device.

Throughout the disclosure, examples are described where a computing device and/or a computing system analyzes information (e.g., context, locations, speeds, search queries) associated with a computing device and a user of a computing device, only if the computing device receives permission from the user of the computing device to analyze the information. For example, in situations discussed below, before a computing device or computing system can collect or may make use of information associated with a user, the user may be provided with an opportunity to provide input to control whether programs or features of the computing device and/or computing system can collect and make use of user information (e.g., information about a user's current location, current speed), or to dictate whether and/or how to the device and/or system may receive content that may be relevant to the user. In addition, certain data may be treated in one or more ways before it is stored or used by the computing device and/or computing system, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

FIGS. 1A-E are conceptual diagrams illustrating an example computing device 110 that is configured to output a graphical user interface of a selected application when access to the selected application is authorized, in accordance with one or more aspects of the present disclosure. Computing device 110 may represent a mobile device, such as a smart phone, a tablet computer, a laptop computer, computerized watch, computerized eyewear, computerized gloves, or any other type of portable computing device. Additional examples of computing device 110 include desktop computers, televisions, personal digital assistants (PDA), portable gaming systems, media players, e-book readers, mobile television platforms, automobile navigation and entertainment systems, vehicle (e.g., automobile, aircraft, or other vehicle) cockpit displays, or any other types of wearable and non-wearable, mobile or non-mobile computing devices that may output a graphical keyboard for display.

Computing device 110 includes a presence-sensitive display (PSD) 112, user interface (UI) module 120 and keyboard module 122. Modules 120 and 122 may perform operations described using software, hardware, firmware, or a mixture of hardware, software, and firmware residing in and/or executing at computing device 110. One or more processors of computing device 110 may execute instructions that are stored at a memory or other non-transitory storage medium of computing device 110 to perform the operations of modules 120 and 122. Computing device 110 may execute modules 120 and 122 as virtual machines executing on underlying hardware. Modules 120 and 122 may execute as one or more services of an operating system or computing platform. Modules 120 and 122 may execute as one or more executable programs at an application layer of a computing platform.

PSD 112 of computing device 110 may function as respective input and/or output devices for computing device 110. PSD 112 may be implemented using various technologies. For instance, PSD 112 may function as input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. PSD 112 may also function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110.

PSD 112 may detect input (e.g., touch and non-touch input) from a user of respective computing device 110. PSD 112 may detect indications of input by detecting one or more gestures from a user (e.g., the user touching, pointing, and/or swiping at or near one or more locations of PSD 112 with a finger or a stylus pen). PSD 112 may output information to a user in the form of a user interface (e.g., user interfaces 114A-114C), which may be associated with functionality provided by computing device 110. Such user interfaces may be associated with computing platforms, operating systems, applications, and/or services executing at or accessible from computing device 110 (e.g., electronic message applications, chat applications, Internet browser applications, mobile or desktop operating systems, social media applications, electronic games, and other types of applications). For example, PSD 112 may present user interfaces 114A-114C (collectively referred to as "user interfaces 114") which, as shown in FIGS. 1A-1E, include graphical user interfaces of an email application and chat application executing at computing device 110 and includes various graphical elements displayed at various locations of PSD 112.

Multi-function button 124 may be configured to manipulate information displayed on PSD 112. In some examples, multi-function button 124 may be spaced apart from PSD 112. For instance, as shown, multi-function button 124 is positioned below PSD 121 on a front surface 130 of computing device 110. In some examples, multi-function button 124 may include at least one sensor configured to generate fingerprint data and/or touch data. For example, multi-function button 124 may include capacitive fingerprint scanners configured to generate fingerprint data. Such fingerprint data may be sufficiently detailed to indicate ridges and valleys that make up a fingerprint. In some examples, multi-function button 124 may include optical and/or infrared fingerprint scanners configured to generate the fingerprint data and/or touch data. In some examples, multi-function button 124 may include multiple regions. As shown, multi-function button 124 may include first region 126A and second region 126B (collectively referred to as "regions 126"). In some examples, regions 126 may be clickable regions. For example, region 126A may move independently from region 126B and provide a haptic feedback (e.g., click) when a user provides sufficient pressure. In some examples, multi-function button 124 may be configured to detect a swipe direction. In some examples, multi-function button 124 may be configured to detect a digit contacting a surface of multi-function button 124. In some examples, multi-function button 124 may be configured to detect a number of digits contacting a surface of multi-function button 124. In some examples, multi-function button 124 may be configured to detect an amount of pressure applied to a surface of multi-function button 124.

Multi-function button 124 may operate in different states. For example, while multi-function button 124 operates in a first state, an upper region of multi-function button 124 may cause computing device 110 to increase a volume and a lower region of multi-function button 124 may cause computing device 110 to decrease a volume. In the example, while multi-function button 124 operates in a second state, an upper region of multi-function button 124 may cause computing device 110 to scroll upward in an application and a lower region of multi-function button 124 may cause computing device 110 to scroll downward in the application. In some examples, a state of multi-function button 124 may correspond to a state for selecting an application. For example, while multi-function button 124 operates in a third state, an upper region of multi-function button 124 may cause computing device 110 to output a graphical user interface of an email application and a lower region of multi-function button 124 may cause computing device 110 to output a graphical user interface of a chat application. In the example, a state of multi-function button 124 may be changed by one or more sensors of computing device 110. For instance, in response to an accelerometer of computing device 110 detecting a double tap gesture onto computing device 110, computing device 110 may toggle or change the state of multi-function button 124 from the first state to the second state or from the second state to the first state.

UI module 120 manages user interactions with PSD 112 and other components of computing device 110. In other words, UI module 120 may act as an intermediary between various components of computing device 110 to make determinations based on user input detected by PSD 112 and/or multi-function button 124 and generate output at PSD 112 in response to the user input. UI module 120 may receive instructions from an application, service, platform, or other module of computing device 110 to cause PSD 112 to output a user interface (e.g., user interfaces 114). UI module 120 may manage inputs received by computing device 110 as a user views and interacts with the user interface presented at PSD 112 and update the user interface in response to receiving additional instructions from the application, service, platform, or other module of computing device 110 that is processing the user input.

Keyboard module 122 may be a stand-alone application, service, or module executing at computing device 110 and in other examples, keyboard module 122 may be a sub-component thereof. For example, keyboard module 122 may be integrated into a chat or messaging application executing at computing device 110 whereas in other examples, keyboard module 122 may be a stand-alone application or subroutine that is invoked by an application or operating platform of computing device 110 any time an application or operating platform requires graphical keyboard input functionality. In some examples, computing device 110 may download and install keyboard module 122 from an application repository of a service provider (e.g., via the Internet). In other examples, keyboard module 122 may be preloaded during production of computing device 110.

Computing device 110 may be configured to operate in a locked state where computing device 110 may restrict access to one or more applications of computing device 110. As shown in FIG. 1A, computing device 110 may output, for display at PSD 112, GUI 114A that indicates a time, day of week, and date, and prevents access to applications of computing device 110 when computing device 110 is in the locked state. In some examples, computing device 110 may provide an authentication challenge that when satisfied may transition computing device 110 into an unlocked state. In the unlocked state, computing device 110 may permit the user may to access the one or more applications that are restricted when computing device operates in the locked state.

Computing device 110 may be configured to transition from a locked state to an unlocked state using multi-function button 124. In the example of FIG. 1B, a user may initiate an authentication challenge to unlock computing device 110 by placing a digit (e.g., right index finger) on region 126A of multi-function button 124.

Rather than simply unlocking a device and waiting for further user input to select a desired application, computing device 110 may authenticate and open a selected application using fingerprint data. For example, computing device 110 may transition from a locked state to an unlocked state based on fingerprint data and open a chat application or an email application based on an indication of a gesture in the fingerprint data.

Multi-function button 124 may generate fingerprint data in response to the user initiating the authentication challenge to unlock computing device 110. For instance, as shown in FIG. 1B, a user may place a digit (e.g., right index finger) on region 126A of multi-function button 124. In response to multi-functional button 124 receiving the digit, computing device 110 may generate the fingerprint data, for instance, by detecting ridges and valleys that make up a fingerprint to generate fingerprint data.

In response to generating the fingerprint data, computing device 110 may determine whether to authorize access to one or more applications that are executable by computing device 110. For example, computing device 110 may compare the fingerprint data with data associated with a fingerprint of an authorized user of computing device 110. More specifically, computing device 110 may access a data store (e.g., locally within computing device 110, at a remote server, etc.) containing data associated with a fingerprint of an authorized user and determine that access to the one or more applications is authorized in response to computing device 110 determining that the fingerprint of the authorized user substantially corresponds to a fingerprint indicated by the fingerprint data. On the other hand, computing device 110 may determine that access to the one or more applications is unauthorized in response to computing device 110 determining that the a fingerprint of the authorized user is substantially different from the fingerprint indicated by the fingerprint data.

In response to computing device 110 determining that access to the one or more applications is authorized, computing device 110 may determine a gesture indicated by the fingerprint data. For instance, computing device 110 may determine that the fingerprint data indicates that region 126A of multi-function button 124 was selected rather than region 126B, or a combination of regions 126.

In response to computing device 110 determining that access to the one or more applications is authorized, computing device 110 may select, based on the gesture, an application of the one or more applications as a selected application. In the examples of FIGS. 1A-E, computing device 110 selects the application of the one or more applications as the selection application according to an indication of a user selection of a region of multi-function button 124. However, in other examples, other criteria may be used by computing device 110 to select the application of the one or more applications as the selection application.

In the example of FIG. 1B, computing device 110 may determine, based on the gesture, an indication of a user selection of region 126A of multi-function button 124. For instance, computing device 110 may determine that the fingerprint data indicates that the user's fingerprint was received substantially at region 126A of multi-function button 124. Responsive to determining the indication of the user selection of region 126A, computing device 110 may determine an application of the one or more applications that is associated with region 126A of multi-function button 124. For instance, computing device 110 may create a mapping table that associates region 126A of multi-function button 124 with a first application (e.g., an email application) and associates 126B of multi-function button 124 with a second application (e.g., a chat application). Computing device 110 may map any suitable number of regions of multi-function button 124. For instance, computing device 110 may map a first region of multi-function button 124 to a first application, a second region of multi-function button 124 to a second application, a third region of multi-function button 124 to a third application, and so on. Computing device 110 may automatically create the mapping table using context information. In some instances, computing device 110 may create the mapping table using one or more user inputs selecting user preferences such that the mapping table may be user customizable. Computing device 110 may store the mapping table using one or more memory devices of computing devices 110. In some instances, a remote server (e.g., cloud computing platform) may store the mapping table remotely, and computing device 110 may access the mapping table remotely.

Figure 1C:
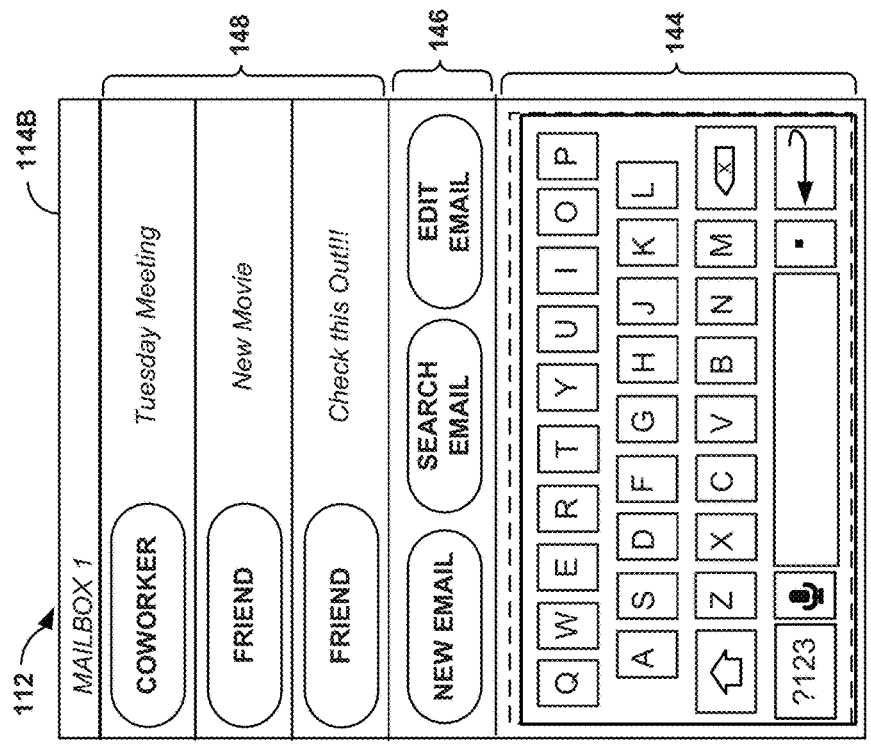
Figure 1B:
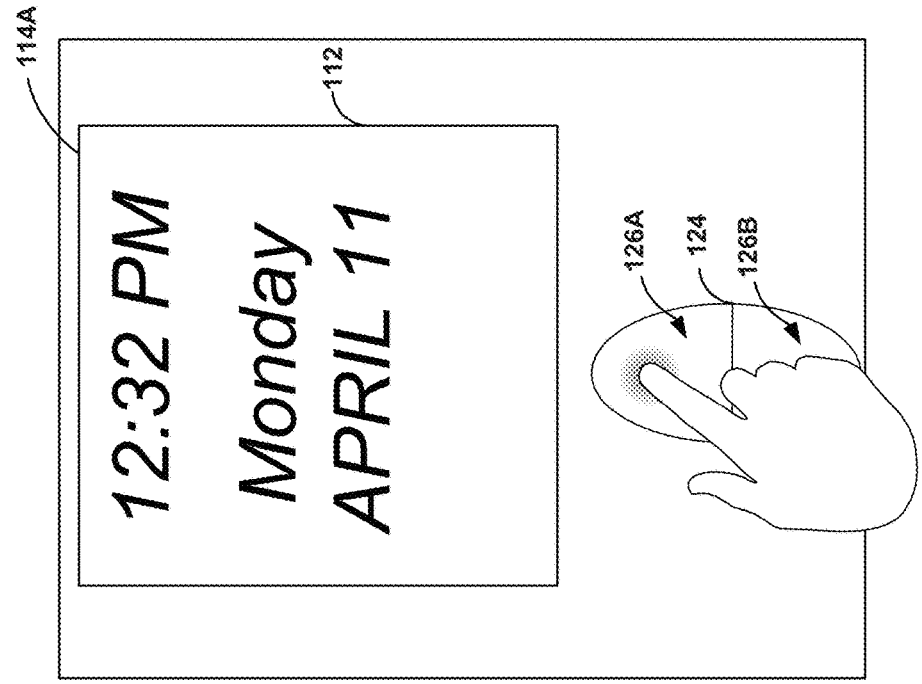

In the example of FIG. 1C, computing device 110 may select the application of the one or more applications that is associated with region 126A of multi-function button 124 as the selected application. As shown, in response to computing device 110 selecting the application of the one or more applications as the selected application, PSD 112 displays, without further user input or user authentication, GUI 114B of the email application. As shown, example GUI 114B may include graphical keyboard region 144, selectable command region 146, and email history region 148.

Figure 1E:
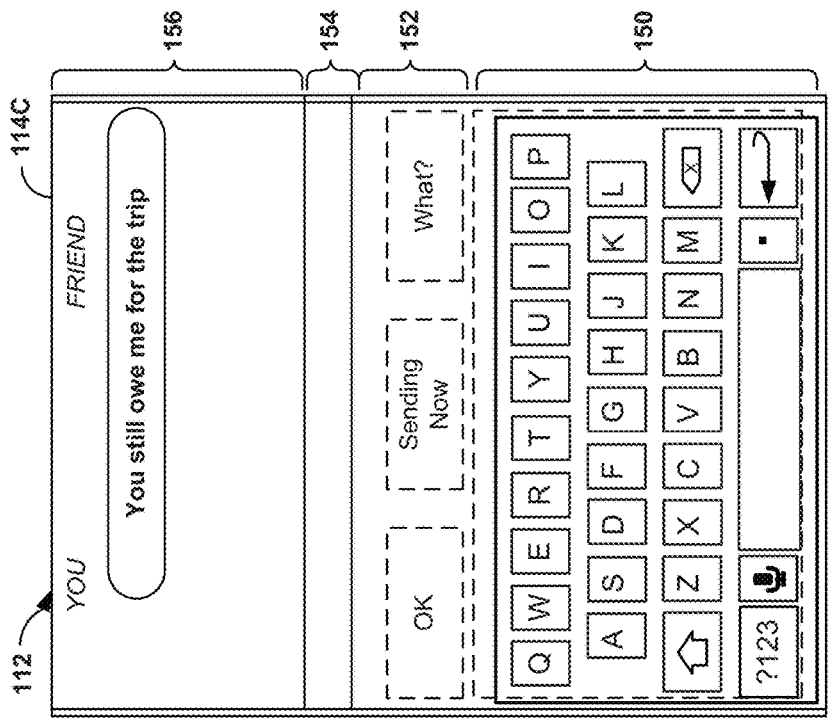
Figure 1D:
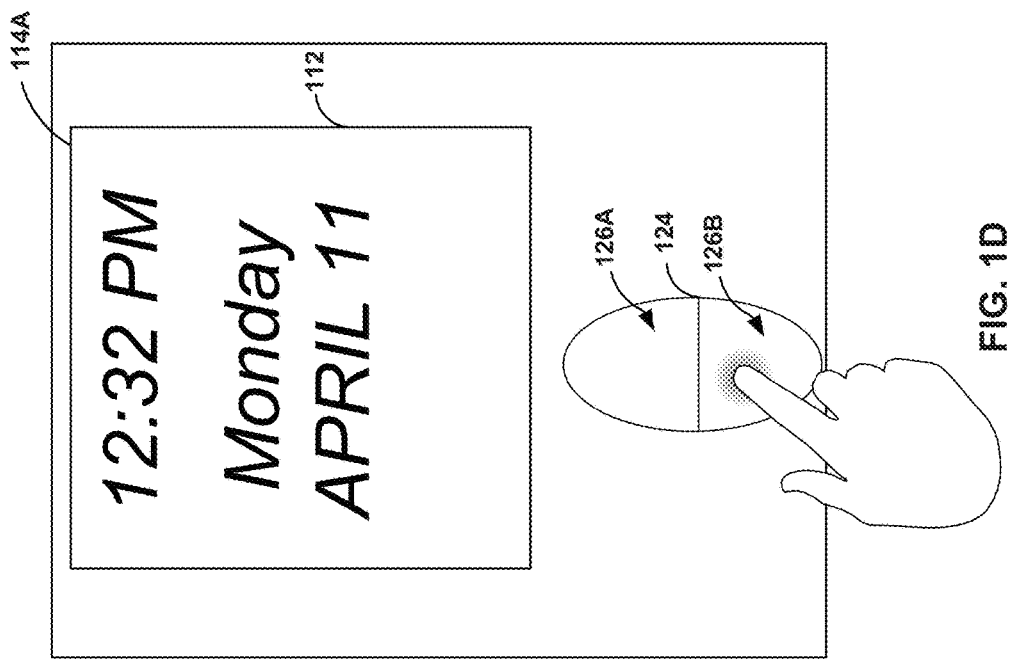

In the example of FIG. 1D, however, computing device 110 may determine, based on the gesture, an indication of a user selection of region 126B of multi-function button 124. For instance, computing device 110 may determine that the fingerprint data indicates that the user's fingerprint was received substantially at region 126B of multi-function button 124. Responsive to determining the indication of the user selection of region 126B, computing device 110 may determine an application of the one or more applications that is associated with region 126B of multi-function button 124. For instance, computing device 110 may access a mapping table that associates 126A of multi-function button 124 with a first application (e.g., an email application) and associates 126B of multi-function button 124 with a second application (e.g., a chat application).

In the example of FIG. 1E, computing device 110 may select the application of the one or more applications that is associated with region 126B of multi-function button 124 as the selected application. As shown, in response to computing device 110 selecting the application of the one or more applications as the selected application, PSD 112 displays, without further user input or user authentication, GUI 114C of the chat application. As shown, example GUI 114C may include keyboard region 150, selectable command region 152, text entry region 154, and chat history region 156.

In response, however, to computing device 110 determining that access to the one or more applications is unauthorized, the computing device 110 may prevent access to GUI 114B and GUI 114C. For example, computing device 110 may output GUI 114A and refrain from outputting GUI 114B and/or GUI 114C.

By permitting computing device 110 to select an application based on a gesture indicated in fingerprint data, a user of computing device 110 may quickly access a desired application without necessarily requiring a user to wade through multiple pages of a home screen to find a desired application. In this way, techniques of this disclosure may reduce the amount of time and the number of user inputs required by a computing device to find a particular application, which may simplify the user experience and may reduce power consumption of a computing device.

FIGS. 2A-D are conceptual diagrams illustrating an example computing device 210 that is configured to select an application according to a swipe direction, in accordance with one or more aspects of the present disclosure. Computing device 210 may be an example of computing device 110 of FIG. 1A. For example, computing device 210 may include UI module 120. As shown, computing device 210 may include PSD 212 that may be substantially similar to PSD 112 of FIG. 1A, and multi-function button 224 that may be substantially similar to multi-function button 124 of FIG. 1A. As shown, PSD 212 may display GUI 214A, which may be substantially similar to GUI 114A of FIG. 1A. For instance, GUI 214A may indicate a time, day of week, and date, and prevent access to applications of computing device 210 when computing device 210 is in the locked state.

Computing device 210 may create a mapping table that associates an upward swipe direction with a first application (e.g., an email application) and associates a downward swipe direction with a second application (e.g., a chat application). Computing device 210 may map any suitable number of swipe directions. For instance, computing device 210 may map a first swipe direction extending to the lower-left portion of multi-function button 224 to a first application, a second swipe direction extending to the middle-left portion of multi-function button 224 to a second application, a third swipe direction extending to the upper-left portion of multi-function button 224 to a third application, and so on. Computing device 210 may automatically create the mapping table using context information. In some instances, computing device 210 may create the mapping table using one or more user inputs selecting user preferences such that the mapping table may be user customizable. Computing device 210 may store the mapping table using one or more memory devices of computing devices 210. In some instances, a remote server (e.g., cloud computing platform) may store the mapping table remotely, and computing device 210 may access the mapping table remotely.

As shown in FIG. 2A, multi-function button 224 may receive gesture 240 that extends upward towards a top portion of PSD 212 and a top portion of computing device 210. For instance, a user may place their finger onto multi-function button 224 such that a sensor of multi-function button 224 may generate fingerprint data and subsequently swipe their finger upward, while maintaining contact with the sensor of multi-function button 224, towards the top portion of PSD 212 and the top portion of computing device 210.

Computing device 210 may determine, based on gesture 240, an indication of a swipe direction. For instance, in response to computing device 210 determining that the fingerprint data indicates a fingerprint reading followed by one or more received inputs above a position of the fingerprint reading, computing device 210 may determine that the swipe direction is upward.

Computing device 210 may determine an application that is associated with the swipe direction. For instance, computing device 210 may determine an application that is mapped, by a mapping table of computing device 210, to the upward swipe direction.

In the example of FIG. 2B, Computing device 210 may select the application of the one or more applications that is associated with the swipe direction as the selected application. As shown in FIG. 2B, in response to determining that gesture 240 indicates an upward direction and that the mapping table associates the upward direction to an email application, computing device 210 causes UI module 120 of computing device 210 to display, on PSD 212, GUI 214B of the email application. As shown, example GUI 214B may include graphical keyboard region 244, selectable command region 246, and email history region 248. Although FIG. 2B illustrates an email application, any suitable application of computing device 210 may be associated with the upward swipe direction or any other swipe direction.

In the example of FIG. 2C, however, multi-function button 224 may receive gesture 242 that extends downward towards a bottom portion of PSD 212 and a bottom portion of computing device 210. For instance, a user may place their finger onto multi-function button 224 such that a sensor of multi-function button 224 may generate fingerprint data and subsequently swipe their finger downward, while maintaining contact with the sensor of multi-function button 224, towards the bottom portion of PSD 212 and the bottom portion of computing device 210.

Computing device 210 may determine, based on gesture 242, an indication of a swipe direction. For instance, in response to computing device 210 determining that the fingerprint data indicates a fingerprint reading followed by one or more received inputs below a position of the fingerprint reading, computing device 210 may determine that the swipe direction is downward.

Computing device 210 may determine an application that is associated with the swipe direction. For instance, computing device 210 may determine an application that is mapped, by a mapping table of computing device 210, to the downward swipe direction.

In the example of FIG. 2D, computing device 210 may select the application of the one or more applications that is associated with the swipe direction as the selected application. As shown in FIG. 2D, in response to determining gesture 242 indicates a downward swipe direction and that the mapping table associates the downward swipe direction to a chat application, computing device 210 causes UI module 120 of computing device 210 to display, on PSD 212, GUI 214C of the chat application. As shown, example GUI 214C may include keyboard region 250, selectable command region 252, text entry region 254, and chat history region 256. Although FIG. 2D illustrates a chat application, any suitable application of computing device 210 may be associated with the downward swipe direction or any other swipe direction.

FIGS. 3A-D are conceptual diagrams illustrating an example computing device 310 that is configured to select an application according to a digit used to generate fingerprint data, in accordance with one or more aspects of the present disclosure. Computing device 310 may be an example of computing device 110 of FIG. 1A. For example, computing device 310 may include UI module 120. As shown, computing device 310 may include PSD 312 that may be substantially similar to PSD 112 of FIG. 1A, and multi-function button 324 that may be substantially similar to multi-function button 124 of FIG. 1A. As shown, PSD 312 may display GUI 314A, which may be substantially similar to GUI 114A of FIG. 1A. For instance, GUI 314A may indicate a time, day of week, and date, and prevent access to applications of computing device 310 when computing device 310 is in the locked state.

Computing device 310 may be configured to determine a digit of an authorized user that corresponds with fingerprint data that is generate by at least one sensor of multi-function button 324. For instance, during a setup operation, computing device 310 may detect, using the at least one sensor of multi-function button 324, fingerprint data and receive an input from the authorized user that indicates a digit that corresponds with the detected fingerprint data. In this manner, computing device 310 may determine whether fingerprint data that is generate by the at least one sensor of multi-function button 324 corresponds or matches with fingerprint data of any one of the digits of the authorized user. Said differently, when computing device 310 determines that fingerprint data that is generated by the at least one sensor of multi-function button 324 corresponds or matches with fingerprint data of a particular digit (e.g., right index finger) of the authorized user, the computing device determines that the particular digit (e.g., right index finger) is the digit applied to multi-function button 324.

Computing device 310 may create a mapping table that associates a first digit of a user (e.g., right index finger) with a first application (e.g., an email application) and associated a second digit (e.g., left index finger) of the user with a second application (e.g., a chat application). Computing device 310 may map any suitable number of digits of a user. For instance, computing device 310 may map a thumb of a user's right hand to a first application, a thumb of a user's left hand to a second application, an index finger of a user's left hand to a third application, an index finger of a user's right hand to a fourth application, and so on. Computing device 310 may automatically create the mapping table using context information. In some instances, computing device 310 may create the mapping table using one or more user inputs selecting user preferences such that the mapping table may be user customizable. Computing device 310 may store the mapping table using one or more memory devices of computing devices 310. In some instances, a remote server (e.g., cloud computing platform) may store the mapping table remotely, and computing device 310 may access the mapping table remotely.

Figures 3A, 3B:
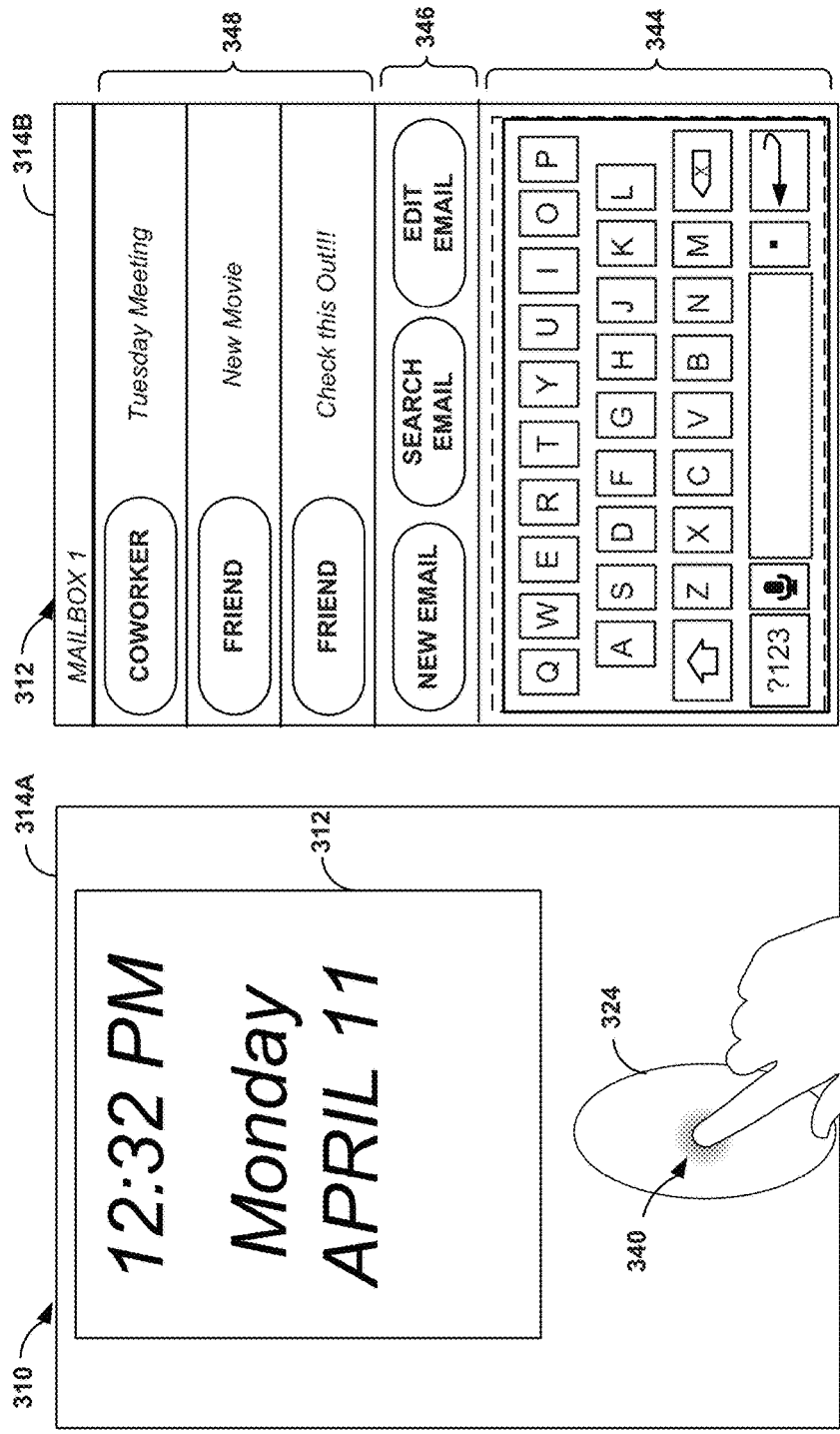
FIGS. 3A-D are conceptual diagrams illustrating an example computing device that is configured to select an application according to a digit used to generate fingerprint data, in accordance with one or more aspects of the present disclosure.

As shown in FIG. 3A, multi-function button 324 may receive gesture 340 from an index finger of an authorized user's right hand. For instance, a user may place their right index finger onto multi-function button 324 such that a sensor of multi-function button 324 may generate fingerprint data.

Computing device 310 may determine, based on gesture 340, an indication of a digit used to generate the fingerprint data. For instance, in response to computing device 310 determining that the fingerprint data indicates a fingerprint corresponding with an index finger of an authorized user's right hand, computing device 310 may determine that the digit used to generate the fingerprint data is the index finger of the authorized user's right hand.

Computing device 310 may determine an application that is associated with the digit used to generate the fingerprint data. For instance, computing device 310 may determine an application that is mapped, by a mapping table of computing device 310, to the index finger of the authorized user's right hand.

In the example of FIG. 3B, computing device 310 may select the application of the one or more applications that is associated with the digit used to generate the fingerprint data as the selected application. As shown in FIG. 3B, in response to determining that gesture 340 indicates an index finger of the authorized user's right hand and that the mapping table associates the index finger of the authorized user's right hand to an email application, computing device 310 causes UI module 120 of computing device 310 to display, on PSD 312, GUI 314B of the email application. As shown, example GUI 314B may include graphical keyboard region 344, selectable command region 346, and email history region 348. Although FIG. 3B illustrates an email application, any suitable application of computing device 310 may be associated with the index finger of the authorized user's right hand or any other digit of an authorized user.

Figures 3C, 3D:
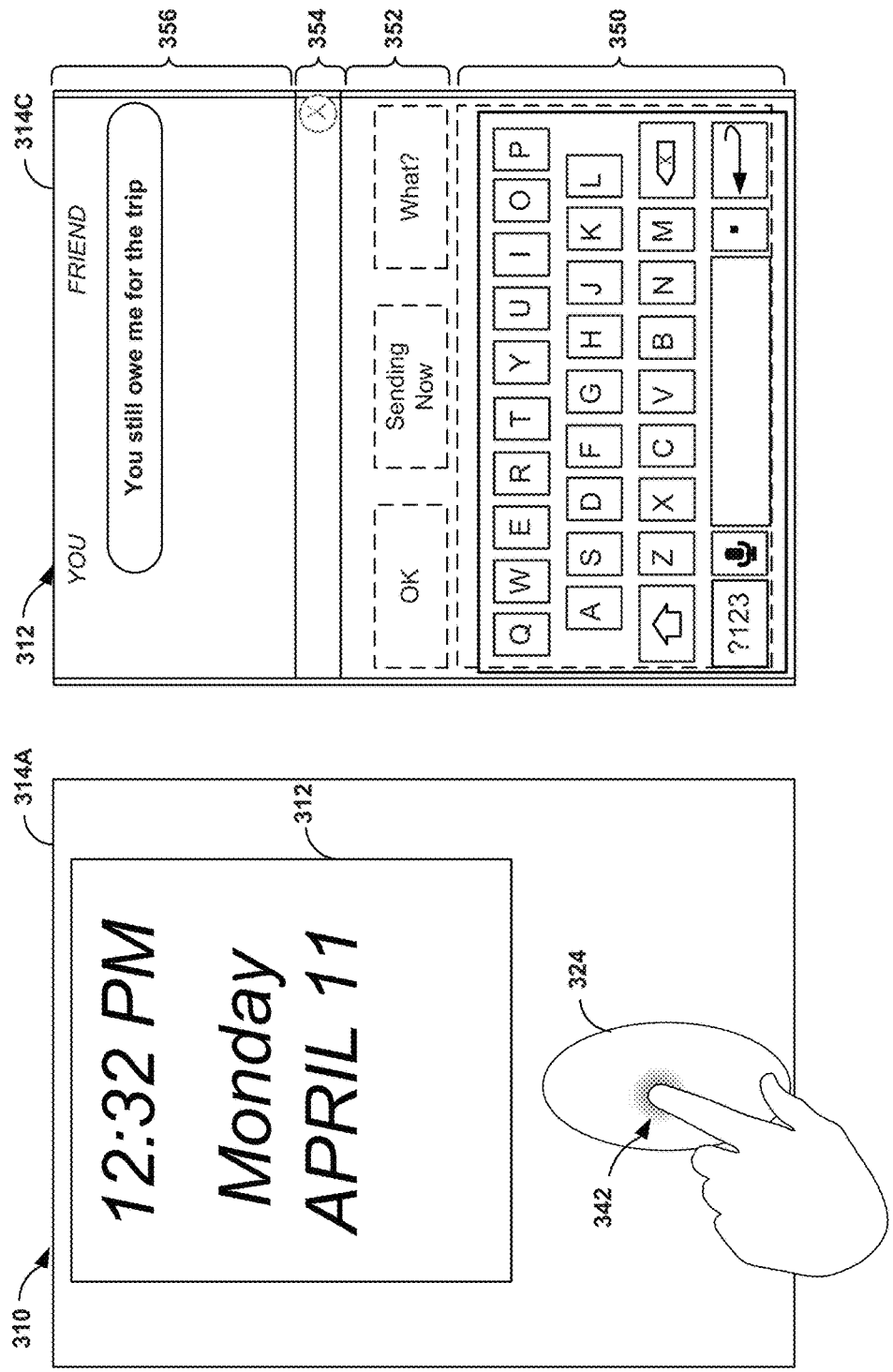

In the example of FIG. 3C, however, multi-function button 324 may receive gesture 342 from an index finger of an authorized user's left hand. For instance, a user may place their left index finger onto multi-function button 324 such that a sensor of multi-function button 324 may generate fingerprint data.

Computing device 310 may determine, based on gesture 342, an indication of a digit used to generate the fingerprint data. For instance, in response to computing device 310 determining that the fingerprint data indicates a fingerprint corresponding with an index finger of an authorized user's left hand, computing device 310 may determine that the digit used to generate the fingerprint data is the index finger of the authorized user's left hand.

Computing device 310 may determine an application that is associated with the digit used to generate the fingerprint data. For instance, computing device 310 may determine an application that is mapped, by a mapping table of computing device 310, to the index finger of the authorized user's left hand.

In the example of FIG. 3D, computing device 310 may select the application of the one or more applications that is associated with the digit used to generate the fingerprint data as the selected application. As shown in FIG. 3D, in response to determining that gesture 342 indicates an index finger of the authorized user's left hand and that the mapping table associates the index finger of the authorized user's left hand to a chat application, computing device 310 causes UI module 120 of computing device 310 to display, on PSD 312, GUI 314C of the chat application. As shown, example GUI 314C may include keyboard region 350, selectable command region 352, text entry region 354, and chat history region 356. Although FIG. 3D illustrates a chat application, any suitable application of computing device 310 may be associated with the index finger of the authorized user's left hand or any other digit of an authorized user.

FIGS. 4A-D are conceptual diagrams illustrating an example computing device 410 that is configured to select an application according to a quantity of digits used to generate fingerprint data, in accordance with one or more aspects of the present disclosure. Computing device 410 may be an example of computing device 110 of FIG. 1A. For example, computing device 410 may include UI module 120. As shown, computing device 410 may include PSD 412 that may be substantially similar to PSD 112 of FIG. 1A, and multi-function button 424 that may be substantially similar to multi-function button 124 of FIG. 1A. As shown, PSD 412 may display GUI 414A, which may be substantially similar to GUI 114A of FIG. 1A. For instance, GUI 414A may indicate a time, day of week, and date, and prevent access to applications of computing device 410 when computing device 410 is in the locked state.

Computing device 410 may create a mapping table that associates a first quantity of digits used to generate fingerprint data (e.g., one digit) with a first application (e.g., an email application) and associated a second quantity of digits used to generate fingerprint data (e.g., 2 digits) with a second application (e.g., a chat application). Computing device 410 may map any suitable quantity of digits used to generate fingerprint data. For instance, computing device 410 may map one digit to a first application, two digits to a second application, three digits to a third application, four digits to a fourth application, and so on. Computing device 410 may automatically create the mapping table using context information. In some instances, computing device 410 may create the mapping table using one or more user inputs selecting user preferences such that the mapping table may be user customizable. Computing device 410 may store the mapping table using one or more memory devices of computing devices 410. In some instances, a remote server (e.g., cloud computing platform) may store the mapping table remotely, and computing device 410 may access the mapping table remotely.

As shown in FIG. 4A, multi-function button 424 may receive gesture 440 from an index finger of an authorized user's right hand. For instance, a user may place their right index finger onto multi-function button 424 such that a sensor of multi-function button 424 may generate fingerprint data.

Computing device 410 may determine, based on gesture 440, an indication of a quantity of digits used to generate the fingerprint data. For instance, in response to computing device 410 determining that the fingerprint data indicates a fingerprint corresponding with an index finger of an authorized user's right hand, computing device 410 may determine that the quantity of used to generate the fingerprint data is one.

Computing device 410 may determine an application that is associated with the quantity of digits used to generate the fingerprint data. For instance, computing device 410 may determine an application that is mapped, by a mapping table of computing device 410, to the quantity of digits that corresponds to one digit.

In the example of FIG. 4B, computing device 410 may select the application of the one or more applications that is associated with the quantity of digits used to generate the fingerprint data as the selected application. As shown in FIG. 4B, in response to determining that gesture 440 indicates a single digit was used to generate the fingerprint data and that the mapping table associates the quantity of digits that corresponds to one digit to an email application, computing device 410 causes UI module 120 of computing device 410 to display, on PSD 412, GUI 414B of the email application. As shown, example GUI 414B may include graphical keyboard region 444, selectable command region 446, and email history region 448. Although FIG. 4B illustrates an email application, any suitable application of computing device 410 may be associated with the quantity of digits that corresponds to one digit or any other quantity of digits of an authorized user.

In the example of FIG. 4C, however, multi-function button 424 may receive gesture 442 from an index finger and a middle finger of an authorized user's right hand. For instance, a user may place their right index finger and their right middle finger simultaneously onto multi-function button 424 such that a sensor of multi-function button 424 may generate fingerprint data.

Computing device 410 may determine, based on gesture 442, an indication of a quantity of digits used to generate the fingerprint data. For instance, in response to computing device 410 determining that the fingerprint data indicates a first fingerprint corresponding with an index finger of an authorized user's right hand and second fingerprint corresponding with a middle finger of the authorized user's right hand, computing device 410 may determine that the quantity of used to generate the fingerprint data is two.

Computing device 410 may determine an application that is associated with the quantity of digits used to generate the fingerprint data. For instance, computing device 410 may determine an application that is mapped, by a mapping table of computing device 410, to the quantity of digits that corresponds to two digits.

In the example of FIG. 4D, computing device 410 may select the application of the one or more applications that is associated with the quantity of digits used to generate the fingerprint data as the selected application. As shown in FIG. 4D, in response to determining that gesture 442 indicates two digits were used to generate the fingerprint data and that the mapping table associates the quantity of digits that corresponds to two digits to a chat application, computing device 410 causes UI module 120 of computing device 410 to display, on PSD 412, GUI 414C of the chat application. As shown, example GUI 414C may include keyboard region 450, selectable command region 452, text entry region 454, and chat history region 456. Although FIG. 4D illustrates a chat application, any suitable application of computing device 410 may be associated with the quantity of digits that corresponds to two digits or any other quantity of digits of an authorized user.

FIGS. 5A-D are conceptual diagrams illustrating an example computing device 510 that is configured to select an application according to an amount of pressure used to generate fingerprint data, in accordance with one or more aspects of the present disclosure. Computing device 510 may be an example of computing device 110 of FIG. 1A. For example, computing device 510 may include UI module 120. As shown, computing device 510 may include PSD 512 that may be substantially similar to PSD 112 of FIG. 1A, and multi-function button 524 that may be substantially similar to multi-function button 124 of FIG. 1A. As shown, PSD 512 may display GUI 514A, which may be substantially similar to GUI 114A of FIG. 1A. For instance, GUI 514A may indicate a time, day of week, and date, and prevent access to applications of computing device 510 when computing device 510 is in the locked state.

Computing device 510 may create a mapping table that associates a first amount of pressure used to generate fingerprint data with a first application (e.g., an email application) and associated a second amount of pressure used to generate fingerprint data with a second application (e.g., a chat application). Computing device 510 may map any suitable amount of pressure used to generate fingerprint data. For instance, computing device 510 may map a first amount of pressure to a first application, a second amount of pressure to a second application, a third amount of pressure to a third application, and so on. In some examples, computing device 510 may create a mapping table that associates a pressure range to applications. For example, computing device 510 may associate a first pressure range to a first application, associate a second pressure range to a second application, associate a third pressure range to a third application, and so on. Computing device 510 may automatically create the mapping table using context information. In some instances, computing device 510 may create the mapping table using one or more user inputs selecting user preferences such that the mapping table may be user customizable. Computing device 510 may store the mapping table using one or more memory devices of computing devices 510. In some instances, a remote server (e.g., cloud computing platform) may store the mapping table remotely, and computing device 510 may access the mapping table remotely.

As shown in FIG. 5A, multi-function button 524 may receive gesture 540 that applies a first amount of pressure. For instance, a user may place their right index finger onto multi-function button 524 and apply a first amount of pressure such that a sensor of multi-function button 524 may generate fingerprint data.

Computing device 510 may determine, based on gesture 540, an indication of an amount of pressure used to generate the fingerprint data. For instance, in response to computing device 510 determining that the fingerprint data indicates a fingerprint corresponding with a first amount of pressure, computing device 510 may determine that the amount of pressure used to generate the fingerprint data is the first amount of pressure.

Computing device 510 may determine an application that is associated with the first amount of pressure used to generate the fingerprint data. For instance, computing device 510 may determine an application that is mapped, by a mapping table of computing device 510, to an amount of pressure that corresponds to the first amount of pressure.

In the example of FIG. 5B, Computing device 510 may select the application of the one or more applications that is associated with the amount of pressure used to generate the fingerprint data as the selected application. As shown in FIG. 5B, in response to determining that gesture 540 indicates a first amount of pressure was used to generate the fingerprint data and that the mapping table associates the first amount of pressure to an email application, computing device 510 causes UI module 120 of computing device 510 to display, on PSD 512, GUI 514B of the email application. As shown, example GUI 514B may include graphical keyboard region 544, selectable command region 546, and email history region 548. Although FIG. 5B illustrates an email application, any suitable application of computing device 510 may be associated with the first amount of pressure used to generate the fingerprint data.

In the example of FIG. 5C, however, multi-function button 524 may receive gesture 542 that applies a second amount of pressure. For instance, a user may place their right index finger onto multi-function button 524 and apply a second amount of pressure such that a sensor of multi-function button 524 may generate fingerprint data.

Computing device 510 may determine, based on gesture 542, an indication of an amount of pressure used to generate the fingerprint data. For instance, in response to computing device 510 determining that the fingerprint data indicates a fingerprint corresponding with the second amount of pressure, computing device 510 may determine that the amount of pressure used to generate the fingerprint data is the second amount of pressure.

Computing device 510 may determine an application that is associated with the second amount of pressure used to generate the fingerprint data. For instance, computing device 510 may determine an application that is mapped, by a mapping table of computing device 510, to an amount of pressure that corresponds to the second amount of pressure.

In the example of FIG. 5D, computing device 510 may select the application of the one or more applications that is associated with the amount of pressure used to generate the fingerprint data as the selected application. As shown in FIG. 5D, in response to determining that gesture 542 indicates a second amount of pressure was used to generate the fingerprint data and that the mapping table associates the second amount of pressure to a chat application, computing device 510 causes UI module 120 of computing device 510 to display, on PSD 512, GUI 514C of the chat application. As shown, example GUI 514C may include keyboard region 550, selectable command region 552, text entry region 554, and chat history region 556. Although FIG. 5D illustrates a chat application, any suitable application of computing device 510 may be associated with the second amount of pressure used to generate the fingerprint data.

Figure 6:
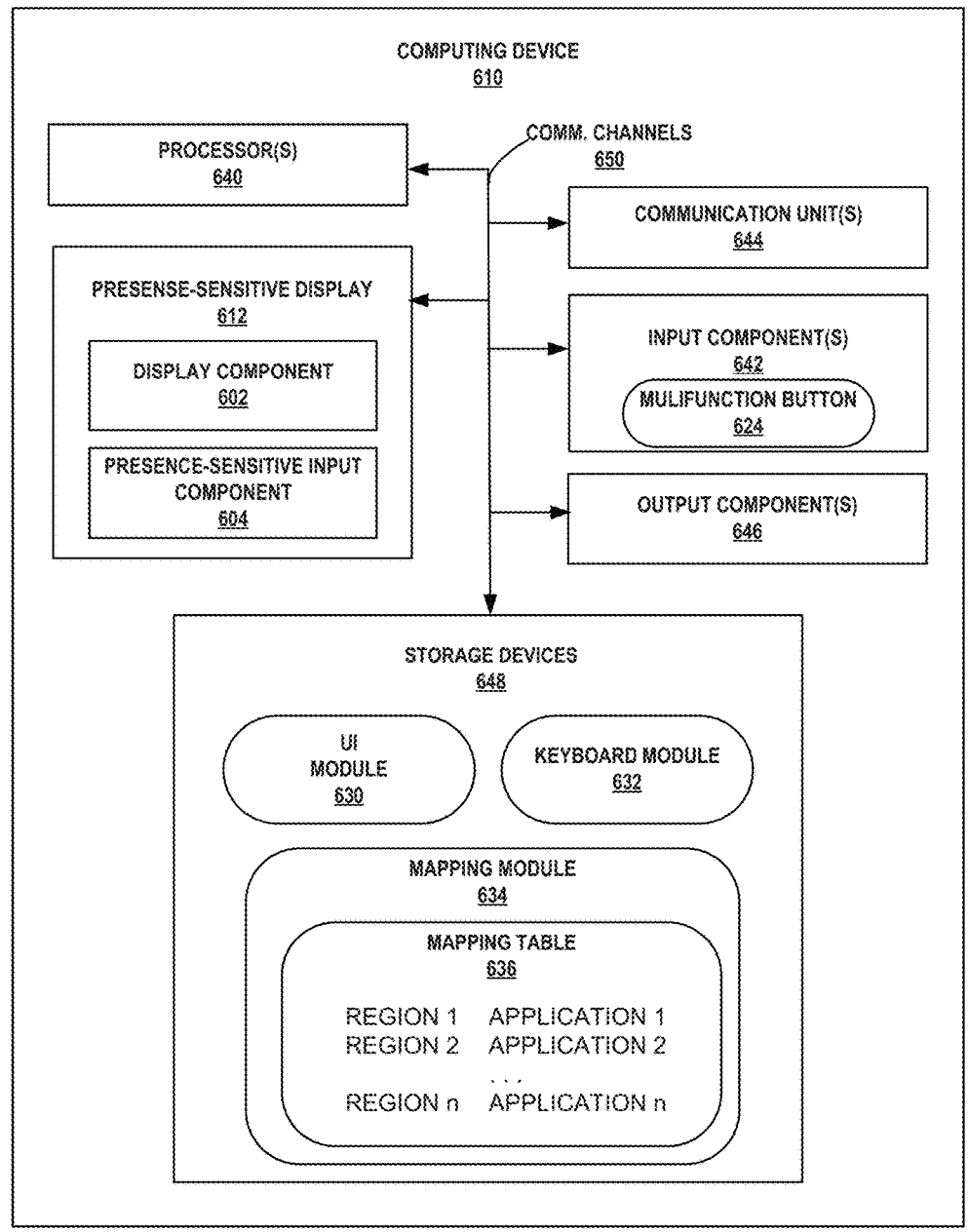
FIG. 6 is a block diagram illustrating an example computing device that is configured to output a graphical user interface of a selected application when access to the selected application is authorized, in accordance with one or more aspects of the present disclosure.

FIG. 6 is a block diagram illustrating an example computing device 610 that is configured to output a graphical user interface of a selected application when access to the selected application is authorized, in accordance with one or more aspects of the present disclosure. Computing device 610 of FIG. 6 in some examples represents an example of computing device 110 of FIG. 1. FIG. 6 illustrates only one particular example of computing device 610, and many other examples of computing device 610 may be used in other instances and may include a subset of the components included in example computing device 610 or may include additional components not shown in FIG. 6.

As shown in the example of FIG. 6, computing device 610 includes presence-sensitive display 612, one or more processors 640, one or more input components 642, one or more communication units 644, one or more output components 646, and one or more storage components 648. Presence-sensitive display 612 includes display component 602 and presence-sensitive input component 604.

Communication channels 650 may interconnect each of the components 602, 604, 612, 640, 642, 644, 646, and 648 for inter-component communications (physically, communicatively, and/or operatively). In some examples, communication channels 650 may include a system bus, a network connection, an inter-process communication data structure, or any other method for communicating data.

One or more input components 642 of computing device 610 may receive input. Examples of input are tactile, audio, image and video input. Input components 642 of computing device 610, in one example, includes a presence-sensitive display, touch-sensitive screen, mouse, keyboard, voice responsive system, a microphone or any other type of device for detecting input from a human or machine. In some examples, input components 642 include one or more sensor components such as one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, a still camera, a video camera, a body camera, eyewear, or other camera device that is operatively coupled to computing device 600, infrared proximity sensor, hygrometer, and the like).

Multi-function button 624 may be configured to manipulate information displayed on PSD 612. Multi-function button 624 may include at least one sensor configured to generate fingerprint data. For example, multi-function button 624 may include capacitive fingerprint scanners configured to generate fingerprint data. Such fingerprint data may be sufficiently detailed to indicate ridges and valleys that make up a fingerprint. In some examples, multi-function button 624 may include optical and/or infrared fingerprint scanners configured to generate the fingerprint data. In some examples, multi-function button 624 may include multiple regions.

One or more output components 646 of computing device 610 may generate output. Examples of output are tactile, audio, still image and video output. Output components 646 of computing device 610, in one example, includes a presence-sensitive display, sound card, video graphics adapter card, speaker, cathode ray tube (CRT) monitor, liquid crystal display (LCD), or any other type of device for generating output to a human or machine.

One or more communication units 644 of computing device 610 may communicate with external devices via one or more wired and/or wireless networks by transmitting and/or receiving network signals on the one or more networks. For example, communication units 644 may be configured to communicate over a network with a remote computing system. Examples of communication unit 644 include a network interface card (e.g. such as an Ethernet card), an optical transceiver, a radio frequency transceiver, a GPS receiver, or any other type of device that can send and/or receive information. Other examples of communication units 644 may include short wave radios, cellular data radios, wireless network radios, as well as universal serial bus (USB) controllers.

Presence-sensitive display 612 of computing device 610 includes display component 602 and presence-sensitive input component 604. Display component 602 may be a screen at which information is displayed by presence-sensitive display 612 and presence-sensitive input component 604 may detect an object at and/or near display component 602. As one example range, presence-sensitive input component 604 may detect an object, such as a finger or stylus that is within two inches or less of display component 602. Presence-sensitive input component 604 may determine a location (e.g., an [x, y] coordinate) of display component 602 at which the object was detected. In another example range, presence-sensitive input component 604 may detect an object six inches or less from display component 602 and other ranges are also possible. Presence-sensitive input component 604 may determine the location of display component 6102 selected by a user's finger using capacitive, inductive, and/or optical recognition techniques. In some examples, presence-sensitive input component 604 also provides output to a user using tactile, audio, or video stimuli as described with respect to display component 602. In the example of FIG. 6, presence-sensitive display 612 may present a user interface.

While illustrated as an internal component of computing device 610, presence-sensitive display 612 may also represent an external component that shares a data path with computing device 610 for transmitting and/or receiving input and output. For instance, in one example, presence-sensitive display 612 represents a built-in component of computing device 610 located within and physically connected to the external packaging of computing device 610 (e.g., a screen on a mobile phone). In another example, presence-sensitive display 612 represents an external component of computing device 610 located outside and physically separated from the packaging or housing of computing device 610 (e.g., a monitor, a projector, etc. that shares a wired and/or wireless data path with computing device 610).

Presence-sensitive display 612 of computing device 610 may receive tactile input from a user of computing device 610. Presence-sensitive display 612 may receive indications of the tactile input by detecting one or more tap or non-tap gestures from a user of computing device 610 (e.g., the user touching or pointing to one or more locations of presence-sensitive display 612 with a finger or a stylus pen). Presence-sensitive display 612 may present output to a user. Presence-sensitive display 612 may present the output as a graphical user interface, which may be associated with functionality provided by various functionality of computing device 610. For example, presence-sensitive display 612 may present various user interfaces of components of a computing platform, operating system, applications, or services executing at or accessible by computing device 610 (e.g., an electronic message application, a navigation application, an Internet browser application, a mobile operating system, etc.). A user may interact with a respective user interface to cause computing device 610 to perform operations relating to one or more the various functions.

Presence-sensitive display 612 of computing device 610 may detect two-dimensional and/or three-dimensional gestures as input from a user of computing device 610. For instance, a sensor of presence-sensitive display 612 may detect a user's movement (e.g., moving a hand, an arm, a pen, a stylus, etc.) within a threshold distance of the sensor of presence-sensitive display 612. Presence-sensitive display 612 may determine a two or three dimensional vector representation of the movement and correlate the vector representation to a gesture input (e.g., a hand-wave, a pinch, a clap, a pen stroke) that has multiple dimensions. In other words, presence-sensitive display 212 can detect a multi-dimension gesture without requiring the user to gesture at or near a screen or surface at which presence-sensitive display 612 outputs information for display. Instead, presence-sensitive display 612 can detect a multi-dimensional gesture performed at or near a sensor which may or may not be located near the screen or surface at which presence-sensitive display 612 outputs information for display.

One or more processors 640 may implement functionality and/or execute instructions associated with computing device 610. Examples of processors 640 include application processors, display controllers, auxiliary processors, one or more sensor hubs, and any other hardware configure to function as a processor, a processing unit, or a processing device. Modules 630-634 may be operable by processors 640 to perform various actions, operations, or functions of computing device 610. For example, processors 640 of computing device 610 may retrieve and execute instructions stored by storage components 648 that cause processors 640 to perform the operations of modules 630-634. The instructions, when executed by processors 640, may cause computing device 610 to store information within storage components 648.

One or more storage components 648 within computing device 610 may store information for processing during operation of computing device 610 (e.g., computing device 610 may store data accessed by modules 630-634 during execution at computing device 610). In some examples, storage component 648 is a temporary memory, meaning that a primary purpose of storage component 648 is not long-term storage. Storage components 648 on computing device 610 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 648, in some examples, also include one or more computer-readable storage media. Storage components 648 in some examples include one or more non-transitory computer-readable storage mediums. Storage components 648 may be configured to store larger amounts of information than typically stored by volatile memory. Storage components 648 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 648 may store program instructions and/or information (e.g., data) associated with modules 630-634. Storage components 648 may include a memory configured to store data or other information associated with modules 630-634.

UI module 630 manages user interactions with PSD 604 and other components of computing device 610. In other words, UI module 630 may act as an intermediary between various components of computing device 610 to make determinations based on user input detected by PSD 612 and/or multi-function button 624 and generate output at PSD 612 in response to the user input. In some examples, UI module 630 may be an example of UI module 120 of FIG. 1A. For example, UI module 630 may receive instructions from an application, service, platform, or other module of computing device 610 to cause PSD 612 to output a user interface.

Keyboard module 632 may be an example of keyboard module 122 of FIG. 1. For example, keyboard module 632 may be a stand-alone application, service, or module executing at computing device 610 and in other examples, keyboard module 632 may be a sub-component thereof. In some examples, computing device 610 may download and install keyboard module 632 from an application repository of a service provider (e.g., via the Internet). In other examples, keyboard module 632 may be preloaded during production of computing device 610.

Mapping module 634 may be configured to associate gestures with applications that are executable by computing device 610. For example, mapping module 634 may associate one or more applications that are executable by computing device 610 to a gesture. For instance, mapping module 634 may associate (e.g., map) an application with a region of multi-function button 624. In another instance, mapping module 634 may associate an application with a swipe direction detected by multi-function button 624. In another instance, mapping module 634 may associate an application with a digit used to generate fingerprint data. In another instance, mapping module 634 may associate an application with a quantity of digits used to generate fingerprint data. In another instance, mapping module 634 may associate an application with an amount of pressure applied to generate fingerprint data. In some examples, mapping module 634 may be configured to associate a single application with a gesture. However, in some examples, mapping module 634 may map each application of a set of applications with a gesture. For instance, mapping module 634 may associate a first application with a first gesture, associate a second application with a second gesture, and so on.

In some examples, mapping module 634 may use mapping table 636 to associate gestures with applications. As shown, in some examples, mapping table 636 is stored locally using storage devices 648 of computing device 610. In some examples, mapping table 636 may be stored remotely. For instance, computing device 610 may access, via communication units 644, a remote server (e.g., cloud computing) that stores mapping table 636. In some examples, mapping module 634 may automatically generate mapping table 636, for instance, using context information and a history of user inputs. For example, when a user frequently uses an email application, mapping module 634 may associate, using mapping table 636, a gesture with the email application and, using UI module 630, cause PSD 612 to display an indication that the gesture is associated with the email application. In some examples, mapping module 634 may prompt a user to associate, mapping table 636, applications with gestures.

Figure 7:
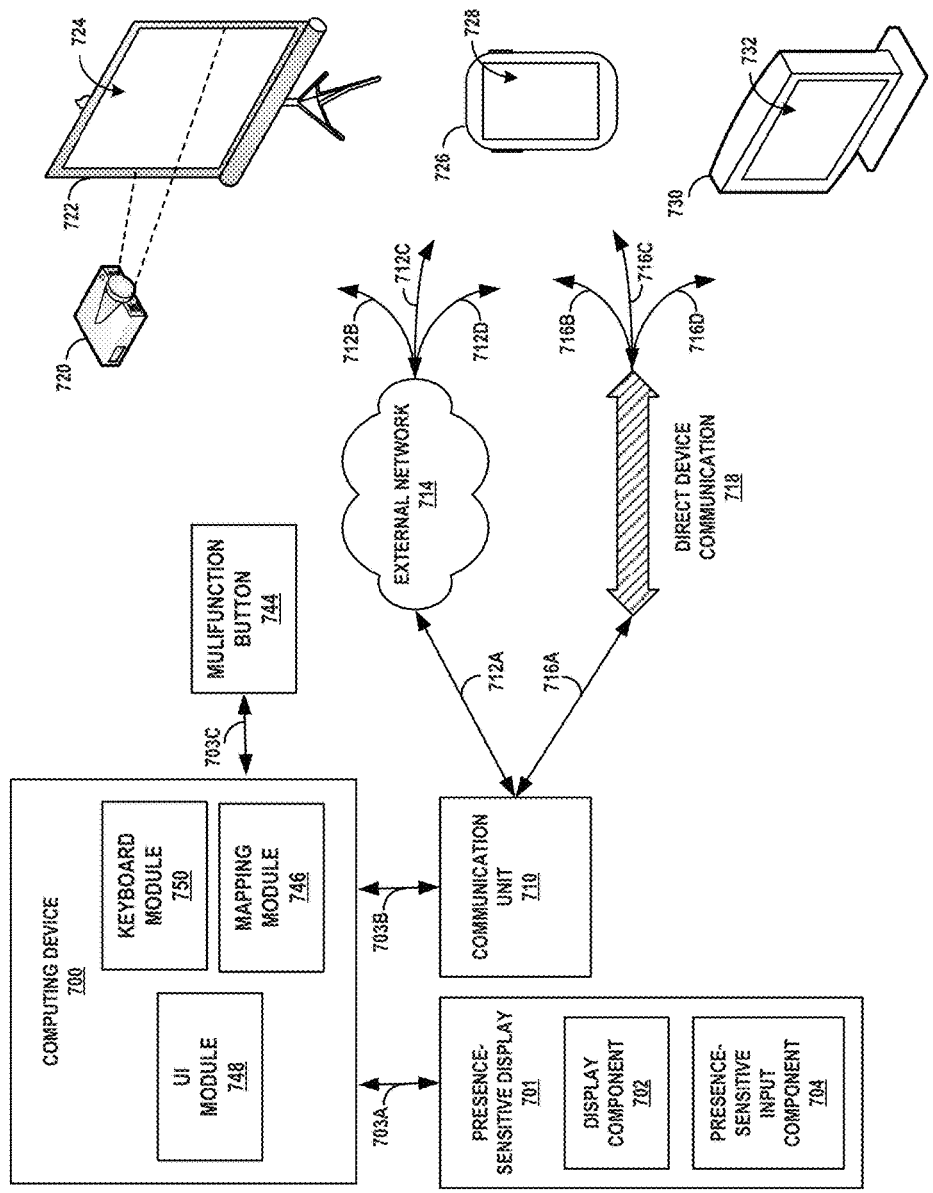
FIG. 7 is a block diagram illustrating an example computing device that is configured to output graphical content for display at a remote device, in accordance with one or more techniques of the present disclosure.

FIG. 7 is a block diagram illustrating an example computing device 700 that is configured to output graphical content for display at a remote device, in accordance with one or more techniques of the present disclosure. Graphical content, generally, may include any visual information that may be output for display, such as text, images, a group of moving images, etc. The example shown in FIG. 7 includes a computing device 700, presence-sensitive display 701, communication unit 710, projector 720, projector screen 722, tablet device 726, and visual display device 730. Although shown for purposes of examples in FIGS. 1A-E, 2A-D, 3A-D, 4A-D, and 5A-D as a stand-alone computing device, a computing device, such as computing device 110, may generally refer to any component or system that includes a processor or other suitable computing environment for executing software instructions and, for example, need not include a presence-sensitive display.

As shown in the example of FIG. 7, computing device 700 may be a processor that includes functionality as described with respect to processors 640 in FIG. 6. In such examples, computing device 700 may be operatively coupled to presence-sensitive display 701 by a communication channel 703A, which may be a system bus or other suitable connection. Computing device 700 may also be operatively coupled to communication unit 710, further described below, by a communication channel 703B, which may also be a system bus or other suitable connection. Computing device 700 may also be operatively coupled to multi-function button 744, further described below, by a communication channel 703C, which may also be a system bus or other suitable connection. Although shown separately as an example in FIG. 7, computing device 700 may be operatively coupled to presence-sensitive display 701, communication unit 710, and multi-function button 744 by any number of one or more communication channels.

In other examples, such as illustrated previously by computing devices in FIGS. 1A-E, 2A-D, 3A-D, 4A-D, and 5A-D, computing device 700 may be a portable or mobile device such as mobile phones (including smart phones), laptop computers, etc. In some examples, computing device 700 may be a desktop computers, tablet computers, smart television platforms, cameras, personal digital assistants (PDAs), servers, mainframes, etc.

Presence-sensitive display 701, like PSDs as shown in FIGS. 1A-E, 2A-D, 3A-D, 4A-D, and 5A-D, may include display component 702 and presence-sensitive input component 704. Display component 702 may, for example, receive data from computing device 700 and display the graphical content. In some examples, presence-sensitive input component 704 may determine one or more user inputs (e.g., continuous gestures, multi-touch gestures, single-touch gestures, etc.) at presence-sensitive display 701 using capacitive, inductive, and/or optical recognition techniques and send indications of such user input to computing device 700 using communication channel 703A. In some examples, presence-sensitive input component 704 may be physically positioned on top of display component 702 such that, when a user positions an input unit over a graphical element displayed by display component 702, the location at which presence-sensitive input component 704 corresponds to the location of display component 702 at which the graphical element is displayed.

As shown in FIG. 7, computing device 700 may also include and/or be operatively coupled with communication unit 710. Communication unit 710 may include functionality of communication unit 644 as described in FIG. 6. Examples of communication unit 710 may include a network interface card, an Ethernet card, an optical transceiver, a radio frequency transceiver, or any other type of device that can send and receive information. Other examples of such communication units may include Bluetooth, 3G, 4G, LTE, and Wi-Fi radios, Universal Serial Bus (USB) interfaces, etc. Computing device 700 may also include and/or be operatively coupled with one or more other devices, e.g., input devices, output devices, memory, storage devices, etc. that are not shown in FIG. 7 for purposes of brevity and illustration.

FIG. 7 also illustrates a projector 720 and projector screen 722. Other such examples of projection devices may include electronic whiteboards, holographic display devices, and any other suitable devices for displaying graphical content. Projector 720 and projector screen 722 may include one or more communication units that enable the respective devices to communicate with computing device 700. In some examples, the one or more communication units may enable communication between projector 720 and projector screen 722. Projector 720 may receive data from computing device 700 that includes graphical content. Projector 720, in response to receiving the data, may project the graphical content onto projector screen 722. In some examples, projector 720 may determine one or more user inputs (e.g., continuous gestures, multi-touch gestures, single-touch gestures, etc.) at projector screen using optical recognition or other suitable techniques and send indications of such user input using one or more communication units to computing device 700.

Projector screen 722, in some examples, may include a presence-sensitive display 724. Presence-sensitive display 724 may include a subset of functionality or all of the functionality of UI module 120 as described in this disclosure. In some examples, presence-sensitive display 724 may include additional functionality. Projector screen 722 (e.g., an electronic whiteboard), may receive data from computing device 700 and display the graphical content. In some examples, presence-sensitive display 724 may determine one or more user inputs (e.g., continuous gestures, multi-touch gestures, single-touch gestures, etc.) at projector screen 722 using capacitive, inductive, and/or optical recognition techniques and send indications of such user input using one or more communication units to computing device 700.

FIG. 7 also illustrates tablet device 726 and visual display device 730. Tablet device 726 and visual display device 730 may each include computing and connectivity capabilities. Examples of tablet device 726 may include e-reader devices, convertible notebook devices, hybrid slate devices, etc. Examples of visual display device 730 may include televisions, computer monitors, etc. As shown in FIG. 7, tablet device 726 may include a presence-sensitive display 728. Visual display device 730 may include a presence-sensitive display 732. Presence-sensitive displays 728, 732 may include a subset of functionality or all of the functionality of UI device 120 as described in this disclosure. In some examples, presence-sensitive displays 728, 732 may include additional functionality. In any case, presence-sensitive display 732, for example, may receive data from computing device 700 and display the graphical content. In some examples, presence-sensitive display 732 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 700.

As described above, in some examples, computing device 700 may output graphical content for display at presence-sensitive display 701 that is coupled to computing device 700 by a system bus or other suitable communication channel. Computing device 700 may also output graphical content for display at one or more remote devices, such as projector 720, projector screen 722, tablet device 726, and visual display device 730. For instance, computing device 700 may execute one or more instructions to generate and/or modify graphical content in accordance with techniques of the present disclosure. Computing device 700 may output the data that includes the graphical content to a communication unit of computing device 700, such as communication unit 710. Communication unit 710 may send the data to one or more of the remote devices, such as projector 720, projector screen 722, tablet device 726, and/or visual display device 730. In this way, computing device 700 may output the graphical content for display at one or more of the remote devices. In some examples, one or more of the remote devices may output the graphical content at a presence-sensitive display that is included in and/or operatively coupled to the respective remote devices.

In some examples, computing device 700 may not output graphical content at presence-sensitive display 701 that is operatively coupled to computing device 700. In other examples, computing device 700 may output graphical content for display at both a presence-sensitive display 701 that is coupled to computing device 700 by communication channel 703A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 700 and output for display at presence-sensitive display 701 may be different than graphical content display output for display at one or more remote devices.

Computing device 700 may send and receive data using any suitable communication techniques. For example, computing device 700 may be operatively coupled to external network 714 using network link 712A. Each of the remote devices illustrated in FIG. 7 may be operatively coupled to network external network 714 by one of respective network links 712B, 712C, and 712D. External network 714 may include network hubs, network switches, network routers, etc., that are operatively inter-coupled thereby providing for the exchange of information between computing device 700 and the remote devices illustrated in FIG. 7. In some examples, network links 712A-D may be Ethernet, asynchronous transfer mode, or other network connections. Such connections may be wireless and/or wired connections.

In some examples, computing device 700 may be operatively coupled to one or more of the remote devices included in FIG. 7 using direct device communication 718. Direct device communication 718 may include communications through which computing device 700 sends and receives data directly with a remote device, using wired or wireless communication. That is, in some examples of direct device communication 718, data sent by computing device 700 may not be forwarded by one or more additional devices before being received at the remote device, and vice-versa. Examples of direct device communication 718 may include Bluetooth, Near-Field Communication, Universal Serial Bus, Wi-Fi, infrared, etc. One or more of the remote devices illustrated in FIG. 7 may be operatively coupled with computing device 700 by communication links 716A-D. In some examples, communication links 712A-D may be connections using Bluetooth, Near-Field Communication, Universal Serial Bus, infrared, etc. Such connections may be wireless and/or wired connections.

Multi-function button 744 may be configured to manipulate information displayed on one or more of PSD 701, projector screen 722, tablet device 726, and PSD 732. Multi-function button 744 may include at least one sensor configured to generate fingerprint data. For example, multi-function button 744 may include capacitive fingerprint scanners configured to generate fingerprint data. Such fingerprint data may be sufficiently detailed to indicate ridges and valleys that make up a fingerprint. In some examples, multi-function button 744 may include optical and/or infrared fingerprint scanners configured to generate the fingerprint data. In some examples, multi-function button 744 may include multiple regions.

UI module 748 manages user interactions with PSD 701 and other components of computing device 700. In other words, UI module 748 may act as an intermediary between various components of computing device 700 to make determinations based on user input detected by PSD 701 and/or multi-function button 744 and generate output at on one or more of PSD 701, projector screen 722, tablet device 726, and PSD 732 in response to the user input. In some examples, UI module 748 may be an example of UI module 120 of FIG. 1A. For example, UI module 748 may receive instructions from an application, service, platform, or other module of computing device 700 to cause on one or more of PSD 701, projector screen 722, tablet device 726, and PSD 732 to output a user interface.

Keyboard module 750 may be an example of keyboard module 122 of FIG. 1. For example, keyboard module 750 may be a stand-alone application, service, or module executing at computing device 700 and in other examples, keyboard module 750 may be a sub-component thereof. In some examples, computing device 700 may download and install keyboard module 750 from an application repository of a service provider (e.g., via the Internet). In other examples, keyboard module 750 may be preloaded during production of computing device 700.

Mapping module 746 may be configured to associate gestures with applications that are executable by computing device 700. In some examples, mapping module 746 may be an example of mapping module 634 of FIG. 6. For example, mapping module 746 may associate one or more applications that are executable by computing device 700 to a gesture.

In accordance with techniques of the disclosure, computing device 700 may be operatively coupled to one or more of PSD 701, projector screen 722, tablet device 726, and PSD 732, computing device 700 using external network 714 to authenticate and display a GUI of a selected application using fingerprint data. For instance, rather than a user authenticating and, then necessarily, wading through multiple home screens to find a desired application for display at one or more of PSD 701, projector screen 722, tablet device 726, and PSD 732, computing device 700 may permit the user to authenticate using a gesture such that computing device 700 outputs, for display at one or more of PSD 701, projector screen 722, tablet device 726, and PSD 732, an application indicated by the gesture used to authenticate. More specifically, in response to multi-function button 744 receiving a gesture by the authorized user, multi-function button 744 may generate fingerprint data that indicates the gesture. Mapping module 746 may associate an application with the gesture indicated in the fingerprint data, and UI module 748 may cause one or more of PSD 701, projector screen 722, tablet device 726, and PSD 732 to display, without further user input or authentication, a GUI of the application associated with the gesture indicated in the fingerprint data.

FIGS. 8A-C are conceptual diagrams illustrating an example computing device 810 that is configured to provide access to components within the computing device using a multi-function button, in accordance with one or more aspects of the present disclosure. Computing device 810 may be an example of computing device 110 of FIG. 1A. For example, computing device 810 may include UI module 820 that may be substantially similar to UI module 120 of FIG. 1A and keyboard module 822 that may be substantially similar to UI module 122 of FIG. 1A. As shown, computing device 810 may include PSD 812 that may be substantially similar to PSD 812 of FIG. 1A, and multi-function button 824 that may be substantially similar to multi-function button 124 of FIG. 1A.

As shown in FIGS. 8A-B, multi-function button 824 may be configured to be releasable detached from computing device 810 to permit access to a cavity 830. As shown in FIG. 8B, cavity 830 may contain a memory device 828. Moreover, as shown in FIGS. 8B-C, memory device 828 may be removed from cavity 830. In this manner, rather than necessarily using additional access points to provide an access to an interior of computing device 810 and to access memory device 828, multi-function button 824 may provide a single entry point to an interior of computing device 810, thereby improving a water resistance of computing device 810.

FIGS. 9A-C are conceptual diagrams illustrating example multi-function buttons 924A-C, in accordance with one or more aspects of the present disclosure. Multi-function buttons 924A-C may be examples of multi-function buttons of 1A-E, 2A-D, 3A-D, 4A-D, and 5A-D.

As shown in FIG. 9A, multi-function button 924A may have an upper region 930 and a lower region 932. Regions 930 and 932 may be clickable regions that provide tactile feedback when a user applies sufficient force to move a clickable portion of multi-function button 924A. As shown, multi-function button 924A may be vertically elongated, such that regions 930 and 932, in one or more examples, have approximately equal widths and lengths.

As shown in the example of FIG. 9B, multi-function button 924B may have a left region 940 and a right region 942. Regions 940 and 942 may be clickable regions that provide tactile feedback when a user applies sufficient force to move a clickable portion of multi-function button 924B. As shown, multi-function button 924B may be horizontally elongated, such that regions 940 and 942 have, in one or more examples, approximately equal widths and lengths.

As shown in FIG. 9C, multi-function button 924C may have an upper left region 950, an upper right region 952, a lower right region 954, and a lower left region 956. Regions 950-956 may be clickable regions that provide tactile feedback when a user applies sufficient force to move a clickable portion of multi-function button 924C. As shown, multi-function button 924C may be circular, such that regions 950-956 have, in one or more examples, approximately equal widths and lengths. In some examples, multi-function button 924C may not be circular. For instance, multi-function button 924C may be an oval, rectangle, triangle, polygon, or another shape.

Figure 10:
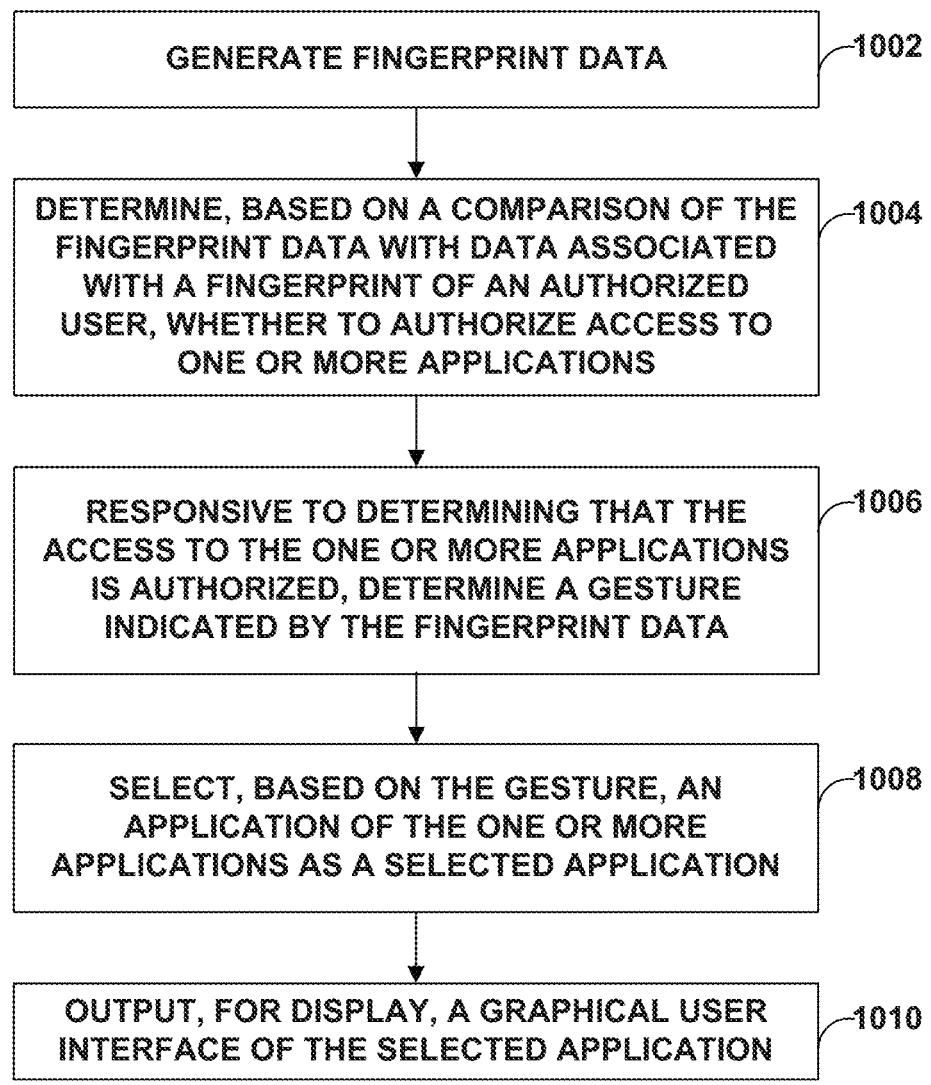
FIG. 10 is a flowchart illustrating example operations of a computing device that is configured to output a graphical user interface of a selected application when access to the selected application is authorized, in accordance with one or more aspects of the present disclosure.

FIG. 10 is a flowchart illustrating example operations of a computing device that is configured to output a graphical user interface of a selected application when access to the selected application is authorized, in accordance with one or more aspects of the present disclosure. The process of FIG. 10 may be performed by one or more processors of a computing device, such as computing device 110 of FIGS. 1A-C. The acts of the process of FIG. 10 may in some examples, be repeated, omitted, and/or performed in any order. For purposes of illustration only, FIG. 10 is described below within the context of computing device 110 of FIGS. 1A-C.

In the example of FIG. 10, computing device 110 generates (1002) fingerprint data. For example, a sensor of multi-function button 124 generates fingerprint data in response to multi-function button 124 receiving an index finger of an authorized user's right hand. Computing device 110 determines (1004), based on a comparison of the fingerprint data with data associated with a fingerprint of an authorized user, whether to authorize access to one or more applications. For example, computing device 110 authorizes access to applications executable by computing device 110 in response to determining that the fingerprint data matches with fingerprint data stored by a memory device of computing device 110 that is associated with an index finger of an authorized user's right hand. On the other hand, in response to computing device 110 determining that the fingerprint data does not match fingerprint data stored by the memory device of computing device 110, computing device 110 does not authorize access to applications executable by computing device 110 and computing device 110 maintains an output of GUI 114A indicating computing device 110 is in a locked state.

In response to determining that the access to the one or more applications is authorized, computing device 110 determines (1006) a gesture indicated by the fingerprint data. For example, computing device 110 determines a region of multi-function button 124 indicated by the gesture. In another example, computing device 110 determines a swipe direction indicated by the gesture. In another example, computing device 110 determines a digit used to generate the fingerprint data. In another example, computing device 110 determines a quantity of digits used to generate the fingerprint data. In another example, computing device 110 determines an amount of pressure applied to generate the fingerprint data.

Computing device 110 selects (1008), based on the gesture, an application of the one or more applications as a selected application. For example, computing device 110 selects an application corresponding to the region of multi-function button 124 indicated by the gesture. In another example, computing device 110 selects an application corresponding to the swipe direction indicated by the gesture. In another example, computing device 110 selects an application corresponding to the digit used to generate the fingerprint data. In another example, computing device 110 selects an application corresponding to the quantity of digits used to generate the fingerprint data. In another example, computing device 110 selects an application corresponding to the amount of pressure applied to generate the fingerprint data.

Computing device 110 outputs (1010), for display, a graphical user interface of the selected application. For example, computing device 110 outputs, for display at PSD 112, GUI 114B of an email application. In another example, computing device 110 outputs, for display at PSD 112, GUI 114C of a chat application.

The following numbered clauses may illustrate one or more aspects of the disclosure:

Clause 1. A method comprising: receiving, by a computing device, fingerprint data that is generated by at least one sensor of the computing device; determining, by a computing device and based on a comparison of the fingerprint data with data that is associated with a fingerprint of an authorized user of the computing device, whether to authorize access to one or more applications that are executable by the computing device; and responsive to determining that access to the one or more applications is authorized: determining, by the computing device, a gesture indicated by the fingerprint data; selecting, by the computing device and based on the gesture, an application of the one or more applications as a selected application; and responsive to selecting the application of the one or more applications as the selected application, outputting, by the computing device and for display, a graphical user interface of the selected application.

Clause 2. The method of clause 1, further comprising: determining, by the computing device and based on the gesture, an indication of a user selection of a region of the at least one sensor; responsive to determining the indication of the user selection of the region, determining, by the computing device, an application of the one or more applications that is associated with the region of the at least one sensor; and responsive to determining the application of the one or more applications that is associated with the region of the at least one sensor, selecting, by the computing device, the application of the one or more applications that is associated with the region of the at least one sensor as the selected application.

Clause 3. The method of any combination of clauses 1-2, further comprising: determining, by the computing device and based on the gesture, an indication of a swipe direction; responsive to determining the indication of the swipe direction, determining, by the computing device, an application of the one or more applications that is associated with the swipe direction; and responsive to determining the application of the one or more applications that is associated with the swipe direction, selecting, by the computing device, the application of the one or more applications that is associated with the swipe direction as the selected application.

Clause 4. The method of any combination of clauses 1-3, further comprising: determining, by the computing device and based on the gesture, an indication of a digit used to generate the fingerprint data; responsive to determining the indication of the digit used to generate the fingerprint data, determining, by the computing device, an application of the one or more applications that is associated with the digit used to generate the fingerprint data; and responsive to determining the application of the one or more applications that is associated with the digit used to generate the fingerprint data, selecting, by the computing device, the application of the one or more applications that is associated with the digit used to generate the fingerprint data as the selected application.

Clause 5. The method of any combination of clauses 1-4, further comprising: determining, by the computing device and based on the gesture, an indication of a quantity of digits used to generate the fingerprint data; responsive to determining the indication of the quantity of digits used to generate the fingerprint data, determining, by the computing device, an application of the one or more applications that is associated with the quantity of digits used to generate the fingerprint data; and responsive to determining the application of the one or more applications that is associated with the quantity of digits used to generate the fingerprint data, selecting, by the computing device, the application of the one or more applications that is associated with the quantity of digits used to generate the fingerprint data as the selected application.

Clause 6. The method of any combination of clauses 1-5, further comprising: determining, by the computing device and based on the gesture, an amount of pressure used to generate the fingerprint data; responsive to determining the amount of pressure used to generate the fingerprint data, determining, by the computing device, an application of the one or more applications that is associated with the amount of pressure used to generate the fingerprint data; and responsive to determining the application of the one or more applications that is associated with the amount of pressure used to generate the fingerprint data, selecting, by the computing device, the application of the one or more applications that is associated with the amount of pressure used to generate the fingerprint data as the selected application.

Clause 7. The method of any combination of clauses 1-6, further comprising: responsive to determining that access to the one or more applications is not authorized, refraining from outputting, by the computing device and for display, the graphical user interface of the selected application.

Clause 8. The method of any combination of clauses 1-7, further comprising: responsive to determining that access to the one or more applications is authorized, outputting, by the computing device and without further authentication, the graphical user interface of the selected application.

Clause 9. A computing device comprising: a presence-sensitive display; at least one sensor configured to generate fingerprint data, the at least one sensor being separate from the presence-sensitive display; at least one processor; and a computer-readable storage device that stores instructions that when executed by the at least one processor cause the at least one processor to: receive fingerprint data that is generated by the at least one sensor; determine, based on a comparison of the fingerprint data with data associated with a fingerprint of an authorized user of the computing device, whether to authorize access to one or more applications that are executable by the computing device; and responsive to determining that access to the one or more applications is authorized: determine a gesture indicated by the fingerprint data; select, based on the gesture, an application of the one or more applications as a selected application; and responsive to selecting the application of the one or more applications as the selected application, output, for display at the presence-sensitive display, a graphical user interface of the selected application.

Clause 10. The computing device of clause 9, wherein the instructions, when executed, cause the at least one processor to: determine, based on the gesture, an indication of a user selection of a region of the at least one sensor; responsive to determining the indication of the user selection of the region, determine an application of the one or more applications that is associated with the region of the at least one sensor; and responsive to determining the application of the one or more applications that is associated with the region of the at least one sensor, select the application of the one or more applications that is associated with the region of the at least one sensor as the selected application.

Clause 11. The computing device of clause 10, wherein the instructions, when executed, cause the at least one processor to: determine, based on the gesture, an indication of a swipe direction; responsive to determining the indication of the swipe direction, determine an application of the one or more applications that is associated with the swipe direction; and responsive to determining the application of the one or more applications that is associated with the swipe direction, select the application of the one or more applications that is associated with the swipe direction as the selected application.

Clause 12. The computing device of any combination of clauses 10-11, wherein the instructions, when executed, cause the at least one processor to: determine, based on the gesture, an indication of a digit used to generate the fingerprint data; responsive to determining the indication of the digit used to generate the fingerprint data, determine an application of the one or more applications that is associated with the digit used to generate the fingerprint data; and responsive to determining the application of the one or more applications that is associated with the digit used to generate the fingerprint data, select the application of the one or more applications that is associated with the digit used to generate the fingerprint data as the selected application.

Clause 13. The computing device of any combination of clauses 10-12, wherein the instructions, when executed, cause the at least one processor to: determine, based on the gesture, an indication of a quantity of digits used to generate the fingerprint data; responsive to determining the indication of the quantity of digits used to generate the fingerprint data, determine an application of the one or more applications that is associated with the quantity of digits used to generate the fingerprint data; and responsive to determining the application of the one or more applications that is associated with the quantity of digits used to generate the fingerprint data, select the application of the one or more applications that is associated with the quantity of digits used to generate the fingerprint data as the selected application.

Clause 14. The computing device of any combination of clauses 10-13, wherein the instructions, when executed, cause the at least one processor to: determine, based on the gesture, an amount of pressure used to generate the fingerprint data; responsive to determining the amount of pressure used to generate the fingerprint data, determine an application of the one or more applications that is associated with the amount of pressure used to generate the fingerprint data; and responsive to determining the application of the one or more applications that is associated with the amount of pressure used to generate the fingerprint data, select the application of the one or more applications that is associated with the amount of pressure used to generate the fingerprint data as the selected application.

Clause 15. The computing device of any combination of clauses 10-14, wherein the instructions, when executed, cause the at least one processor to: responsive to determining that access to the one or more applications is not authorized, refrain from outputting, for display at the presence-sensitive display, the graphical user interface of the selected application.

Clause 16. The computing device of any combination of clauses 10-14, wherein the instructions, when executed, cause the at least one processor to: responsive to determining that access to the one or more applications is authorized, output, without further authentication, the graphical user interface of the selected application.

Clause 17. A computer-readable storage medium encoded with instructions that, when executed by at least one processor of a computing device, cause the at least one processor to: receive fingerprint data that is generated by at least one sensor of the computing device; determine, based on a comparison of the fingerprint data with data that is associated with a fingerprint of an authorized user of the computing device, whether to authorize access to one or more applications that are executable by the computing device; and responsive to determining that access to the one or more applications is authorized: determine a gesture indicated by the fingerprint data; select, based on the gesture, an application of the one or more applications as a selected application; and responsive to selecting the application of the one or more applications as the selected application, output, for display, a graphical user interface of the selected application.

Clause 18. The computer-readable storage medium of clause 17, wherein the instructions, when executed, cause the at least one processor to: determine, based on the gesture, an indication of a user selection of a region of the at least one sensor; responsive to determining the indication of the user selection of the region, determine an application of the one or more applications that is associated with the region of the at least one sensor; and responsive to determining the application of the one or more applications that is associated with the region of the at least one sensor, select the application of the one or more applications that is associated with the region of the at least one sensor as the selected application.

Clause 19. The computer-readable storage medium of any combination of clauses 17-18, wherein the instructions, when executed, cause the at least one processor to: determine, based on the gesture, an indication of a swipe direction; responsive to determining the indication of the swipe direction, determine an application of the one or more applications that is associated with the swipe direction; and responsive to determining the application of the one or more applications that is associated with the swipe direction, select the application of the one or more applications that is associated with the swipe direction as the selected application.

Clause 20. The computer-readable storage medium of any combination of clauses 17-19, wherein the instructions, when executed, cause the at least one processor to: determine, based on the gesture, an indication of a digit used to generate the fingerprint data; responsive to determining the indication of the digit used to generate the fingerprint data, determine an application of the one or more applications that is associated with the digit used to generate the fingerprint data; and responsive to determining the application of the one or more applications that is associated with the digit used to generate the fingerprint data, select the application of the one or more applications that is associated with the digit used to generate the fingerprint data as the selected application.

Clause 21. The computer-readable storage medium of any combination of clauses 17-20, wherein the instructions, when executed, cause the at least one processor to: determine, based on the gesture, an indication of a quantity of digits used to generate the fingerprint data; responsive to determining the indication of the quantity of digits used to generate the fingerprint data, determine an application of the one or more applications that is associated with the quantity of digits used to generate the fingerprint data; and responsive to determining the application of the one or more applications that is associated with the quantity of digits used to generate the fingerprint data, select the application of the one or more applications that is associated with the quantity of digits used to generate the fingerprint data as the selected application.

Clause 22. The computer-readable storage medium of any combination of clauses 17-21, wherein the instructions, when executed, cause the at least one processor to: determine, based on the gesture, an amount of pressure used to generate the fingerprint data; responsive to determining the amount of pressure used to generate the fingerprint data, determine an application of the one or more applications that is associated with the amount of pressure used to generate the fingerprint data; and responsive to determining the application of the one or more applications that is associated with the amount of pressure used to generate the fingerprint data, select the application of the one or more applications that is associated with the amount of pressure used to generate the fingerprint data as the selected application.

Clause 23. The computer-readable storage medium of any combination of clauses 17-22, wherein the instructions, when executed, cause the at least one processor to: responsive to determining that access to the one or more applications is not authorized, refrain from outputting, for display at the presence-sensitive display, the graphical user interface of the selected application.

Clause 24. The computer-readable storage medium of any combination of clauses 17-23, wherein the instructions, when executed, cause the at least one processor to: responsive to determining that access to the one or more applications is authorized, output, without further authentication, the graphical user interface of the selected application.

Clause 25. A method comprising: receiving, by a computing device, touch data that is generated by at least one sensor of the computing device; determining, by the computing device, a gesture indicated by the touch data; selecting, by the computing device and based on the gesture, an application of one or more applications that are executable by the computing device as a selected application; and responsive to selecting the application of the one or more applications as the selected application, outputting, by the computing device and for display, a graphical user interface of the selected application.

Clause 26. The method of clause 25, further comprising: determining, by the computing device and based on the gesture, an indication of a user selection of a region of the at least one sensor; responsive to determining the indication of the user selection of the region, determining, by the computing device, that the application of the one or more applications is associated with the region of the at least one sensor; and responsive to determining that the application of the one or more applications is associated with the region of the at least one sensor, selecting, by the computing device, the application of the one or more applications that is associated with the region of the at least one sensor as the selected application.

Clause 27. The method of any combination of clauses 25-26, further comprising: determining, by the computing device and based on the gesture, an indication of a swipe direction; responsive to determining the indication of the swipe direction, determining, by the computing device, that the application of the one or more applications is associated with the swipe direction; and responsive to determining that the application of the one or more applications is associated with the swipe direction, selecting, by the computing device, the application of the one or more applications that is associated with the swipe direction as the selected application.

Clause 28. The method of any combination of clauses 25-27, further comprising: determining, by the computing device and based on the gesture, an indication of a digit used to generate the touch data; responsive to determining the indication of the digit used to generate the touch data, determining, by the computing device, that the application of the one or more applications is associated with the digit used to generate the touch data; and responsive to determining that the application of the one or more applications is associated with the digit used to generate the touch data, selecting, by the computing device, the application of the one or more applications that is associated with the digit used to generate the touch data as the selected application.

Clause 29. The method of any combination of clauses 25-28, further comprising: determining, by the computing device and based on the gesture, an indication of a quantity of digits used to generate the touch data; responsive to determining the indication of the quantity of digits used to generate the touch data, determining, by the computing device, that the application of the one or more applications is associated with the quantity of digits used to generate the touch data; and responsive to determining that the application of the one or more applications is associated with the quantity of digits used to generate the touch data, selecting, by the computing device, the application of the one or more applications that is associated with the quantity of digits used to generate the touch data as the selected application.

Clause 30. The method of any combination of clauses 25-29, further comprising: determining, by the computing device and based on the gesture, an amount of pressure used to generate the touch data; responsive to determining the amount of pressure used to generate the touch data, determining, by the computing device, that the application of the one or more applications is associated with the amount of pressure used to generate the touch data; and responsive to determining that the application of the one or more applications is associated with the amount of pressure used to generate the touch data, selecting, by the computing device, the application of the one or more applications that is associated with the amount of pressure used to generate the touch data as the selected application.

Clause 31. The method of any combination of clauses 25-30, further comprising: determining, by the computing device, whether a state of the at least one sensor of the computing device corresponds to a state for selecting an application of the one or more applications, wherein the selecting the application of the one or more applications as the selected application is in response to determining that the state of the at least one sensor of the computing device corresponds to the state for selecting the application of the one or more applications.

Clause 32. The method of any combination of clauses 25-31, further comprising: responsive to determining that the state of the at least one sensor of the computing device does not correspond to the state for selecting an application of the one or more applications, refraining from selecting the application of the one or more applications as the selected application.

Clause 33. The method of any combination of clauses 25-32, further comprising: receiving, by the computing device, state change data that is generated by one or more sensors of the computing device that are different than the at least one sensor of the computing device; and determining, by the computing device and based on the state change data, the state of the at least one sensor of the computing device.

Clause 34. A computing device comprising: a presence-sensitive display; at least one sensor configured to generate touch data, the at least one sensor being separate from the presence-sensitive display; at least one processor; and a computer-readable storage device that stores instructions that when executed by the at least one processor cause the at least one processor to: receive touch data that is generated by the at least one sensor of the computing device; determine a gesture indicated by the touch data; select, based on the gesture, an application of one or more applications that are executable by the computing device as a selected application; and responsive to selecting the application of the one or more applications as the selected application, output, for display, a graphical user interface of the selected application.

Clause 35. The computing device of clause 34, wherein the instructions, when executed, cause the at least one processor to: determine, based on the gesture, an indication of a user selection of a region of the at least one sensor; responsive to determining the indication of the user selection of the region, determine that the application of the one or more applications is associated with the region of the at least one sensor; and responsive to determining that the application of the one or more applications is associated with the region of the at least one sensor, select the application of the one or more applications that is associated with the region of the at least one sensor as the selected application.

Clause 36. The computing device of any combination of clauses 34-35, wherein the instructions, when executed, cause the at least one processor to: determine, based on the gesture, an indication of a swipe direction; responsive to determining the indication of the swipe direction, determine that the application of the one or more applications is associated with the swipe direction; and responsive to determining that the application of the one or more applications is associated with the swipe direction, select the application of the one or more applications that is associated with the swipe direction as the selected application.

Clause 37. The computing device of any combination of clauses 34-36, wherein the instructions, when executed, cause the at least one processor to: determine, based on the gesture, an indication of a digit used to generate the touch data; responsive to determining the indication of the digit used to generate the touch data, determine that the application of the one or more applications is associated with the digit used to generate the touch data; and responsive to determining that the application of the one or more applications is associated with the digit used to generate the touch data, select the application of the one or more applications that is associated with the digit used to generate the touch data as the selected application.

Clause 38. The computing device of any combination of clauses 34-37, wherein the instructions, when executed, cause the at least one processor to: determine, based on the gesture, an indication of a quantity of digits used to generate the touch data; responsive to determining the indication of the quantity of digits used to generate the touch data, determine that the application of the one or more applications is associated with the quantity of digits used to generate the touch data; and responsive to determining that the application of the one or more applications is associated with the quantity of digits used to generate the touch data, select the application of the one or more applications that is associated with the quantity of digits used to generate the touch data as the selected application.

Clause 39. The computing device of any combination of clauses 34-38, wherein the instructions, when executed, cause the at least one processor to: determine, based on the gesture, an amount of pressure used to generate the touch data; responsive to determining the amount of pressure used to generate the touch data, determine that the application of the one or more applications is associated with the amount of pressure used to generate the touch data; and responsive to determining that the application of the one or more applications is associated with the amount of pressure used to generate the touch data, select the application of the one or more applications that is associated with the amount of pressure used to generate the touch data as the selected application.

Clause 40. The computing device of any combination of clauses 34-39, wherein the instructions, when executed, cause the at least one processor to: determine whether a state of the at least one sensor of the computing device corresponds to a state for selecting an application of the one or more applications, wherein the selecting the application of the one or more applications as the selected application is in response to determining that the state of the at least one sensor of the computing device corresponds to the state for selecting the application of the one or more applications.

Clause 41. The computing device of any combination of clauses 34-40, wherein the instructions, when executed, cause the at least one processor to: responsive to determining that the state of the at least one sensor of the computing device does not correspond to the state for selecting the application of the one or more applications, refrain from selecting the application of the one or more applications as the selected application.

Clause 42. The computing device of any combination of clauses 34-41, further comprising: one or more sensors configured to generate state change data, the one or more sensors being separate from the presence-sensitive display and being different than the at least one sensor, wherein the instructions, when executed, cause the at least one processor to: receive state change data that is generated by the one or more sensors, and determine, based on the state change data, the state of the at least one sensor of the computing device.

Clause 43. A computing device comprising means for performing the method of any combination of clauses 1-8 or 25-33.

Clause 44. A computer-readable storage medium encoded with instructions that, when executed, cause a computing device to perform the method of any combination of clauses 1-8 or 25-33.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
receiving, by a computing device, fingerprint data that is generated by a fingerprint sensor of the computing device, the fingerprint sensor being separate from a presence-sensitive display of the computing device and operating in a first state, the fingerprint sensor comprising a plurality of regions, and the first state defining one or more functions for one or more of the plurality of regions;
determining, by the computing device and based on a comparison of the fingerprint data with data that is associated with a fingerprint of an authorized user of the computing device, whether to authorize access to one or more applications that are executable by the computing device; and
responsive to determining that access to the one or more applications is authorized:
determining, by the computing device, a gesture indicated by the fingerprint data;
identifying, by the computing device and based on the gesture, a user selection of a particular region of the plurality of regions of the fingerprint sensor;
responsive to identifying the user selection of the particular region, determining, based on a mapping table accessible by the computing device that includes associations between a region of the plurality of regions with one or more functions, a first application of the one or more applications that is associated with the particular region of the fingerprint sensor;
responsive to determining the first application, outputting, by the computing device and for display, a graphical user interface of the first application;
determining a second state of the fingerprint sensor, the second state redefining one or more functions for one or more of the plurality of regions; and
operating the fingerprint sensor in the determined second state.

2. The method of claim 1, wherein the fingerprint data is first fingerprint data and the gesture is a first gesture, the method further comprising:
receiving, by the computing device, second fingerprint data that is generated by the fingerprint sensor;
determining, by the computing device, a second gesture indicated by the second fingerprint data;

determining, by the computing device and based on the second gesture, a swipe direction;
responsive to determining the swipe direction, determining, by the computing device, a second application of the one or more applications that is associated with the swipe direction; and
responsive to determining the second application that is associated with the swipe direction, outputting, by the computing device, a graphical user interface of the second application that is associated with the swipe direction.

3. The method of claim 1, wherein the fingerprint data is first fingerprint data and the gesture is a first gesture, the method further comprising:
receiving, by the computing device, second fingerprint data that is generated by the fingerprint sensor;
determining, by the computing device, a second gesture indicated by the second fingerprint data;
determining, by the computing device and based on the second gesture, a digit used to generate the second fingerprint data;
responsive to determining the digit used to generate the fingerprint data, determining, by the computing device, a second application of the one or more applications that is associated with the digit; and
responsive to determining the second application that is associated with the digit, outputting, by the computing device, a graphical user interface of the second application that is associated with the digit.

4. The method of claim 1, wherein the fingerprint data is first fingerprint data and the gesture is a first gesture, the method further comprising:
receiving, by the computing device, second fingerprint data that is generated by the fingerprint sensor;
determining, by the computing device, a second gesture indicated by the second fingerprint data;
determining, by the computing device and based on the second gesture, a quantity of digits used to generate the second fingerprint data;
responsive to determining the quantity of digits, determining, by the computing device, a second application of the one or more applications that is associated with the quantity of digits; and
responsive to determining the second application that is associated with the quantity of digits, outputting, by the computing device, a graphical user interface of the second application that is associated with the quantity of digits.

5. The method of claim 1, wherein the fingerprint data is first fingerprint data and the gesture is a first gesture, the method further comprising:
receiving, by the computing device, second fingerprint data that is generated by the fingerprint sensor;
determining, by the computing device, a second gesture indicated by the second fingerprint data;
determining, by the computing device and based on the second gesture, an amount of pressure used to generate the second fingerprint data;
responsive to determining the amount of pressure, determining, by the computing device, a second application of the one or more applications that is associated with the amount of pressure; and
responsive to determining the second application of the one or more applications that is associated with the amount of pressure used to generate the fingerprint data, outputting, by the computing device, a graphical user interface of the second application that is associated with the amount of pressure.

6. The method of claim 1, further comprising:
responsive to determining that access to the one or more applications is not authorized, refraining from outputting, by the computing device and for display, the graphical user interface of the first application.

7. The method of claim 1, wherein the second state of the fingerprint sensor is determined in response to detecting an event by a second sensor of the computing device.

8. The method of claim 7, wherein the second sensor is an accelerometer.

9. The method of claim 1, wherein the second state of the fingerprint sensor is determined in response to the outputting of the graphical user interface of the first application, and one of the one or more functions redefined by the second state control the operation of the first application for which the graphical user interface is displayed.

10. The method of claim 1, wherein one of the one or more functions redefined by the second state cause the computing device to output a graphical user interface of a second application of the one or more applications for display.

11. The method of claim 1, wherein one of the one or more functions redefined by the second state cause an increase or decrease in audio volume of the computing device.

12. The method of claim 1, wherein the association between the first application and the particular region of the fingerprint sensor is automatically generated based on a history of user behavior in accessing applications of the computing device.

13. A computing device comprising:
a presence-sensitive display;
a fingerprint sensor configured to generate fingerprint data, the fingerprint sensor being separate from the presence-sensitive display and operating in a first state, the fingerprint sensor comprising a plurality of regions, and the first state defining one or more functions for one or more of the plurality of regions;
at least one processor; and
a computer-readable storage device that stores instructions that when executed by the at least one processor cause the at least one processor to:
receive fingerprint data that is generated by the fingerprint sensor;
determine, based on a comparison of the fingerprint data with data associated with a fingerprint of an authorized user of the computing device, whether to authorize access to one or more applications that are executable by the computing device; and
responsive to determining that access to the one or more applications is authorized:
determine a gesture indicated by the fingerprint data;
identify, based on the gesture, a user selection of a particular region of the plurality of regions of the fingerprint sensor;
responsive to identifying the user selection of the particular region, determine, based on a mapping table that includes associations between a region of the plurality of regions with one or more functions, a first application of the one or more applications that is associated with the particular region of the fingerprint sensor; and
responsive to determining the first application, output, for display at the presence-sensitive display, a graphical user interface of the first application;

determine a second state of the fingerprint sensor, the second state redefining one or more functions for one or more of the plurality of regions; and operate the fingerprint sensor in the determined second state.

14. The computing device of claim 13, wherein the fingerprint data is first fingerprint data and the gesture is a first gesture, and wherein the instructions, when executed, cause the at least one processor to:

receive second fingerprint data that is generated by the fingerprint sensor;

determine a second gesture indicated by the second fingerprint data;

determine, based on the second gesture, a swipe direction;

responsive to determining the swipe direction, determine a second application of the one or more applications that is associated with the swipe direction; and responsive to determining the second application that is associated with the swipe direction, output a graphical user interface of the second application that is associated with the swipe direction.

15. The computing device of claim 13, wherein the fingerprint data is first fingerprint data and the gesture is a first gesture, and wherein the instructions, when executed, cause the at least one processor to:

receive second fingerprint data that is generated by the fingerprint sensor;

determine a second gesture indicated by the second fingerprint data;

determine, based on the second gesture, an indication of a digit used to generate the second fingerprint data;

responsive to determining the digit, determine a second application of the one or more applications that is associated with the digit; and responsive to determining the second application that is associated with the digit, output a graphical user interface of the second application that is associated with the digit.

16. The computing device of claim 13, wherein the fingerprint data is first fingerprint data and the gesture is a first gesture, and wherein the instructions, when executed, cause the at least one processor to:

receive second fingerprint data that is generated by the fingerprint sensor;

determine a second gesture indicated by the second fingerprint data;

determine, based on the second gesture, a quantity of digits used to generate the second fingerprint data;

responsive to determining the quantity of digits, determine a second application of the one or more applications that is associated with the quantity of digits; and responsive to determining the second application that is associated with the quantity of digits, output a graphical user interface of the second application that is associated with the quantity of digits.

17. The computing device of claim 13, wherein the fingerprint data is first fingerprint data and the gesture is a first gesture, and wherein the instructions, when executed, cause the at least one processor to:

receive second fingerprint data that is generated by the fingerprint sensor;

determine a second gesture indicated by the second fingerprint data;

determine, based on the second gesture, an amount of pressure used to generate the second fingerprint data;

responsive to determining the amount of pressure, determine a second application of the one or more applications that is associated with the amount of pressure; and responsive to determining the second application that is associated with the amount of pressure, output a graphical user interface of the second application that is associated with the amount of pressure.

18. The computing device of claim 13, wherein the instructions, when executed, cause the at least one processor to:

responsive to determining that access to the one or more applications is not authorized, refrain from outputting, for display at the presence-sensitive display, the graphical user interface of the first application.

19. A computer-readable storage medium encoded with instructions that, when executed by at least one processor of a computing device, cause the at least one processor to:

receive fingerprint data that is generated by a fingerprint sensor of the computing device, the fingerprint sensor being separate from a presence-sensitive display and operating in a first state, the fingerprint sensor comprising a plurality of regions, and the first state defining one or more functions for one or more of the plurality of regions;

determine, based on a comparison of the fingerprint data with data that is associated with a fingerprint of an authorized user of the computing device, whether to authorize access to one or more applications that are executable by the computing device; and responsive to determining that access to the one or more applications is authorized:

determine a gesture indicated by the fingerprint data;

identify, based on the gesture, a user selection of a particular region of the plurality of regions of the fingerprint sensor;

responsive to identifying the user selection of the particular region, determine, based on a mapping table that includes associations between a region of the plurality of regions with one or more functions, a first application of the one or more applications that is associated with the particular region of the fingerprint sensor;

responsive to determining the first application, output, for display, a graphical user interface of the first application;

determine a second state of the fingerprint sensor, the second state redefining one or more functions for one or more of the plurality of regions; and operate the fingerprint sensor in the determined second state.

20. The computer-readable storage medium of claim 19, wherein the fingerprint data is first fingerprint data and the gesture is a first gesture, and wherein the instructions, when executed, cause the at least one processor to:

receive second fingerprint data that is generated by the fingerprint sensor;

determine a second gesture indicated by the second fingerprint data;

determine, based on the second gesture, a swipe direction;

responsive to determining the swipe direction, determine a second application of the one or more applications that is associated with the swipe direction; and responsive to determining the second application that is associated with the swipe direction, output a graphical user interface of the second application that is associated with the swipe direction.

21. The computer-readable storage medium of claim 19, wherein the fingerprint data is first fingerprint data and the gesture is a first gesture, and wherein the instructions, when executed, cause the at least one processor to:
- receive second fingerprint data that is generated by the fingerprint sensor;
- determine a second gesture indicated by the second fingerprint data;
- determine, based on the second gesture, a digit used to generate the second fingerprint data;
- responsive to determining the digit, determine a second application of the one or more applications that is associated with the digit; and
- responsive to determining the second application that is associated with the digit, output a graphical user interface of the second application that is associated with the digit.

22. The computer-readable storage medium of claim 19, wherein the fingerprint data is first fingerprint data and the gesture is a first gesture, and wherein the instructions, when executed, cause the at least one processor to:
- receive second fingerprint data that is generated by the fingerprint sensor;
- determine a second gesture indicated by the second fingerprint data;
- determine, based on the second gesture, a quantity of digits used to generate the second fingerprint data;
- responsive to determining the quantity of digits, determine a second application of the one or more applications that is associated with the quantity of digits; and
- responsive to determining the second application that is associated with the quantity of digits, output a graphical user interface of the second application that is associated with the quantity of digits.

23. The computer-readable storage medium of claim 19, wherein the fingerprint data is first fingerprint data and the gesture is a first gesture, and wherein the instructions, when executed, cause the at least one processor to:
- receive second fingerprint data that is generated by the fingerprint sensor;
- determine a second gesture indicated by the second fingerprint data;
- determine, based on the second gesture, an amount of pressure used to generate the second fingerprint data;
- responsive to determining the amount of pressure, determine a second application of the one or more applications that is associated with the amount of pressure; and
- responsive to determining the second application that is associated with the amount of pressure, output a graphical user interface of the second application that is associated with the amount of pressure.

* * * * *